US012188293B2

(12) United States Patent
Gomez

(10) Patent No.: US 12,188,293 B2
(45) Date of Patent: Jan. 7, 2025

(54) MULLION

(71) Applicant: Anthony, Inc., Sylmar, CA (US)

(72) Inventor: Valeria Lionzo Gomez, Santa Clarita, CA (US)

(73) Assignee: Anthony, Inc., Sylmar, CA (US)

(*) Notice: Subject to any disclaimer, the term of this patent is extended or adjusted under 35 U.S.C. 154(b) by 833 days.

(21) Appl. No.: 17/327,496

(22) Filed: May 21, 2021

(65) Prior Publication Data

US 2022/0372811 A1 Nov. 24, 2022

(51) Int. Cl.
*E06B 1/52* (2006.01)
*F25D 23/02* (2006.01)

(52) U.S. Cl.
CPC ............ *E06B 1/524* (2013.01); *F25D 23/028* (2013.01); *F25D 2201/12* (2013.01)

(58) Field of Classification Search
CPC ............................ E06B 1/524; F25D 2201/12
See application file for complete search history.

(56) References Cited

U.S. PATENT DOCUMENTS

| | | | |
|---|---|---|---|
| 1,893,399 | A | 1/1933 | Gasket |
| 2,591,003 | A | 4/1952 | Philipp |
| 2,858,408 | A | 10/1958 | Barroero |
| 3,167,821 | A | 2/1965 | Clark et al. |
| 3,274,741 | A | 9/1966 | Neagle |
| 3,697,723 | A | 10/1972 | Winsler et al. |
| 3,882,637 | A | 5/1975 | Lindenschmidt |
| 4,004,370 | A | 1/1977 | Heaney |
| 4,150,518 | A | 4/1979 | Truesdell et al. |
| 4,330,310 | A | 5/1982 | Tate, Jr. et al. |
| 4,588,235 | A | 5/1986 | Barroero |
| 4,741,127 | A | 5/1988 | Bockwinkel |
| 4,831,780 | A | 5/1989 | Bockwinkel et al. |
| 4,852,303 | A | 8/1989 | Rolek |
| 4,858,386 | A | 8/1989 | Nail |
| 4,891,912 | A | 1/1990 | Bockwinkel |
| 4,941,289 | A | 7/1990 | Rolek |
| 4,948,206 | A | 8/1990 | Fitzpatrick |
| 4,998,382 | A | 3/1991 | Kostos et al. |
| 5,024,023 | A | 6/1991 | Kostos et al. |

(Continued)

FOREIGN PATENT DOCUMENTS

| | | |
|---|---|---|
| CN | 103189696 | 7/2013 |
| CN | 205561404 | 9/2016 |

(Continued)

OTHER PUBLICATIONS

Office Action in Canadian Appln. No. 3,159,623, dated Aug. 17, 2023, 4 pages.

(Continued)

*Primary Examiner* — Babajide A Demuren
(74) *Attorney, Agent, or Firm* — Fish & Richardson P.C.

(57) ABSTRACT

A mullion includes a body including a first co-extruded portion and a second co-extruded portion adjacent to the first co-extruded portion. The second co-extruded portion has a lower density than the first co-extruded portion. In some implementations, the mullion includes a body having a rear section and a pair of opposing lateral sections adjoining either side of the rear section. The lateral sections can each include two or more walls spaced from one another in a lateral direction.

27 Claims, 22 Drawing Sheets

(56) References Cited

U.S. PATENT DOCUMENTS

| | | | | |
|---|---|---|---|---|
| 5,035,085 | A | 7/1991 | Mamelson et al. | |
| 5,111,618 | A | 5/1992 | Kaspar et al. | |
| 5,117,587 | A | 6/1992 | Doan | |
| 5,214,877 | A | 6/1993 | Kaspar et al. | |
| 5,255,473 | A | 10/1993 | Kasper | |
| 5,269,099 | A | 12/1993 | Kennedy et al. | |
| 5,645,330 | A | 7/1997 | Artwohl et al. | |
| 5,720,536 | A | 2/1998 | Jenkins et al. | |
| 5,992,960 | A | 11/1999 | Wolanin | |
| 6,029,411 | A | 2/2000 | Richardson | |
| 6,298,615 | B1 | 10/2001 | Richardson | |
| 6,350,002 | B1 * | 2/2002 | Takaoka | F25D 23/065 220/592.02 |
| 6,367,223 | B1 | 4/2002 | Richardson et al. | |
| 7,096,640 | B1 | 8/2006 | Chevian et al. | |
| 7,147,292 | B2 | 12/2006 | Lee et al. | |
| 7,407,240 | B2 | 8/2008 | Collins et al. | |
| 8,070,305 | B2 | 12/2011 | Bratton | |
| 8,083,305 | B2 | 12/2011 | Lee et al. | |
| 8,801,116 | B1 | 8/2014 | Pack et al. | |
| 8,985,795 | B2 | 3/2015 | Thomas et al. | |
| 8,998,354 | B2 | 4/2015 | Wach et al. | |
| 9,157,675 | B2 | 10/2015 | Howington et al. | |
| 9,328,549 | B1 | 5/2016 | Alexander et al. | |
| 9,389,013 | B2 | 7/2016 | Rolek et al. | |
| 9,417,006 | B2 | 8/2016 | Shen | |
| 10,045,638 | B2 | 8/2018 | Artwohl | |
| 10,178,917 | B2 | 1/2019 | Thoutam et al. | |
| 10,182,664 | B2 | 1/2019 | Chikkakalbalu et al. | |
| 10,365,029 | B2 * | 7/2019 | Grenier | E06B 1/325 |
| 10,390,632 | B2 | 8/2019 | Artwohl et al. | |
| 10,655,906 | B2 | 5/2020 | Okazaki et al. | |
| 10,898,011 | B2 | 1/2021 | Artwohl et al. | |
| 11,684,180 | B2 | 6/2023 | Gomez | |
| 11,832,740 | B2 | 12/2023 | Ramirez et al. | |
| 2001/0003408 | A1 | 6/2001 | Otto et al. | |
| 2005/0242529 | A1 | 11/2005 | Kim et al. | |
| 2006/0080995 | A1 | 4/2006 | An | |
| 2009/0007587 | A1 | 1/2009 | Lanzl et al. | |
| 2011/0011121 | A1 | 1/2011 | Kim | |
| 2011/0304253 | A1 | 12/2011 | Howington et al. | |
| 2013/0285517 | A1 | 10/2013 | Wach et al. | |
| 2014/0103791 | A1 | 4/2014 | Cheon | |
| 2014/0203699 | A1 | 7/2014 | Pack et al. | |
| 2015/0250332 | A1 | 9/2015 | Mille et al. | |
| 2015/0338153 | A1 | 11/2015 | Zhao et al. | |
| 2016/0047592 | A1 | 2/2016 | Rolek et al. | |
| 2018/0146798 | A1 * | 5/2018 | Artwohl | F25D 23/082 |
| 2018/0344054 | A1 | 12/2018 | Artwohl et al. | |
| 2019/0212051 | A1 | 7/2019 | Mayer et al. | |
| 2019/0335922 | A1 | 11/2019 | Artwohl et al. | |
| 2021/0059433 | A1 | 3/2021 | Lennon | |
| 2021/0227998 | A1 | 7/2021 | Artwohl et al. | |
| 2022/0369832 | A1 | 11/2022 | Gomez | |
| 2022/0369833 | A1 | 11/2022 | Ramirez et al. | |
| 2022/0373244 | A1 | 11/2022 | Powade et al. | |
| 2022/0373246 | A1 | 11/2022 | Ramirez et al. | |
| 2023/0086468 | A1 | 3/2023 | Lanzl | |
| 2023/0301445 | A1 | 9/2023 | Gomez | |
| 2024/0081554 | A1 | 3/2024 | Ramirez et al. | |

FOREIGN PATENT DOCUMENTS

| | | | |
|---|---|---|---|
| CN | 106500435 | | 3/2017 |
| DE | 102009002800 | | 5/2009 |
| DE | 102012223544 | | 6/2014 |
| EP | 1801525 | | 1/2012 |
| EP | 2908074 | | 8/2015 |
| EP | 2985551 | | 2/2016 |
| FR | 1314273 | A | 1/1963 |
| GB | 335362 | | 9/1930 |
| JP | 2002107078 | | 4/2002 |
| WO | WO 2000/20719 | | 4/2000 |
| WO | WO 2004083545 | | 9/2004 |
| WO | WO2008066542 | A1 | 6/2008 |
| WO | WO 2010042186 | | 4/2010 |
| WO | WO 2011076445 | | 6/2011 |
| WO | WO 2013060417 | | 5/2013 |
| WO | WO 2014030041 | | 2/2014 |
| WO | WO 2015127996 | | 9/2015 |
| WO | WO 2018097912 | | 5/2018 |

OTHER PUBLICATIONS

Office Action in Canadian Appln. No. 3,159,636, dated Jul. 27, 2023, 4 pages.

Office Action in Canadian Appln. No. 3,159,638, dated Sep. 6, 2023, 7 pages.

Office Action in Canadian Appln. No. 3,159,643, dated Sep. 27, 2023, 6 pages.

Office Action in Canadian Appln. No. 3,159,647, dated Jul. 27, 2023, 4 pages.

CN Office Action in Chinese Application No. 201780080430.0, dated Feb. 3, 2020, 11 pages (with English translation).

EP Office Action in European Application No. 17 800 979.1, dated Mar. 13, 2019, 5 pages.

International Search Report and Written Opinion in International Application No. PCT/US2017/057512, dated Jan. 16, 2018, 14 pages.

Office Action in Canadian Appln. No. 3,159,636, dated Aug. 5, 2024, 3 pages.

* cited by examiner

MULLION

TECHNICAL FIELD

This invention relates to temperature controlled storage devices, and doors and associated frames used in such devices.

BACKGROUND

Refrigerated enclosures are used in commercial, institutional, and residential applications for storing and/or displaying refrigerated or frozen objects. Refrigerated enclosures may be maintained at temperatures above freezing (e.g., a refrigerator) or at temperatures below freezing (e.g., a freezer). Refrigerated enclosures have one or more doors or windows for accessing and viewing refrigerated or frozen objects within a temperature-controlled space. Refrigerated enclosures typically include a frame that supports the doors or windows.

Condensation on sealing surfaces of doors of refrigerated enclosures and their associated frames can impair sealing and decrease energy efficiency. Formation of condensation (or frost formation) on a door also affects visibility to product placed inside enclosure and may cause customer dissatisfaction. Electric heater wires are sometimes employed in the thermal frames of commercial refrigerated enclosures to inhibit condensation. However, electrical heaters can use a significant amount of electrical power. Excess reliance on such heater wires may make ever more stringent government regulations on energy efficiency more difficult to meet.

Some current mullions have thin walls, resulting in thermal loss. In addition, a non-uniform design of the mullions often creates several air spots without isolation between mullion, plastic cover, and retainer. These air spots allow thermal transfer and consequently decrease the overall product thermal efficiency.

Current mullions often require a component to place the heater wires called a retainer. For this and other reasons, current mullion assemblies may have a greater number of parts, labor time, and consequently higher cost.

Some current fiberglass mullions are formed through a process called pultrusion. Pultrusion processes may be relatively expensive.

Current mullion brackets often allow significant air infiltration and cold transference. The cold air on the back of the frame may infiltrate due a lack of an efficient isolation between mullion, bracket and frame. In addition, many existing mullions have walls (e.g., steel 0.09" thickness) that allow cold temperatures inside of the case to be transferred through the mullion, bracket, and frame. The differences in temperatures (e.g., between cold frame and warm room temperature) may create condensation on the frame top and bottom.

SUMMARY

One aspect of the invention features a mullion including a body having a first co-extruded portion and a second co-extruded portion adjacent to the first co-extruded portion. The second co-extruded portion has a lower density than the first co-extruded portion.

In some implementations, the lower-density second portion of the mullion body includes a cellular material.

In some implementations, the body includes a rigid polymer with glass fiber.

In some implementations, the lower-density second portion of the mullion body couples with a contact plate for the mullion.

In some implementations, the lower-density second portion of the mullion body forms a thermal barrier between a contact plate and the first portion of the mullion.

In some implementations, the lower-density second portion of the mullion body includes a pair of pads spaced from one another, wherein each of the pads includes a front surface that couples with a portion of a contact plate.

In some implementations, the lower-density second portion of the mullion body includes one or more channels that receives a heater wire for the mullion.

In some implementations, the first portion of the mullion body includes one or more lateral sections of the mullion.

In some implementations, the lateral sections of the mullion are at least about ⅜ inches thick.

In some implementations, the mullion includes a contact plate that couples with at least one of the co-extruded portions of the body.

In some implementations, the second portion of the mullion body includes one or more zipper engaging portions. The mullion further includes one or more zippers that couple with the second portion and retain the contact plate on the mullion.

In some implementations, the mullion includes one or more zippers that couples with the second portion and retain the contact plate on the mullion. The zippers include a flat front surface.

In some implementations, the mullion includes an external finish over at least a portion of the body. The external finish reduces heat transfer between the body and air surrounding the body.

In some implementations, the first portion of the mullion body includes a rear section and a pair of opposing lateral sections adjoining either side of the rear section. The lateral sections or the rear section include two or more walls spaced from one another such as to define one or more pockets in the body of the mullion.

Another aspect of the invention features a method of making a mullion that includes: extruding a first portion of a segment of the mullion, and co-extruding, along with the first portion, a second portion of the segment. The second portion has a lower density than the first portion.

Another aspect of the invention features a mullion including a body having a rear section and a pair of opposing lateral sections adjoining either side of the rear section. The lateral sections can each include two or more walls spaced from one another in a lateral direction. The lateral sections comprise a front surface that couples with a contact plate.

In some implementations, the lateral sections includes one or more pockets between at least two of the walls.

In some implementations, the first portion of the mullion body includes one or more lateral sections of the mullion that are at least about ⅜ inches thick.

In some implementations, the second portion of the mullion body includes a zipper engaging portion. The mullion further includes one or more zippers that couple with the second portion and retain the contact plate on the mullion.

In some implementations, the mullion includes an external finish over at least a portion of the body. The external finish reduces heat transfer between the body and air surrounding the body.

Another aspect of the invention features a mullion with a body having a rear section and opposing lateral sections that adjoin either side of the rear section. One or more insulating members are included on an interior surface one or more of the lateral sections.

In some implementations, the insulating members include a foam material.

In some implementations, the insulating members include a channel for a heater wire.

In some implementations, the lateral sections include an interior channel. The insulating members at least partially reside in the interior channel.

In some implementations, the lateral sections include a channel for a heater wire in front of the interior channel.

In some implementations, the mullion includes a mullion cover that couples to the body.

Another aspect of the invention features a refrigerated enclosure including a frame assembly, doors coupled to the frame assembly, a mullion, and one or more mullion brackets. The frame assembly includes a top frame segment and a bottom frame segment. The mullion includes a pair of opposing lateral walls and a mullion interior space. The mullion bracket(s) includes a mullion-engaging portion coupled with the mullion, a frame-engaging portion coupled with one of the frame segments, a middle portion between the mullion-engaging portion and the frame-engaging portion, and a flange projecting from the middle portion. The flange is coupled with one end of the mullion such that air flow between the mullion interior space and the other side of the flange is inhibited.

In some implementations, the flange of the mullion bracket includes a perimeter flange that goes around a perimeter of the middle portion of the mullion bracket. The perimeter flange forms a barrier between the mullion interior space and the other side of the perimeter flange.

In some implementations, the flange of the mullion bracket caps a mullion interior space on one end of the mullion.

In some implementations, the mullion-engaging portion of the mullion bracket includes a body that extends into the mullion between the opposing lateral walls of the mullion.

In some implementations, the body of the mullion-engaging portion of the mullion bracket is secured to one or more of the opposing lateral walls of the mullion.

In some implementations, the refrigerated enclosure includes a pair of fasteners that pass through the opposing lateral walls of the mullion. The engaging portion of the mullion bracket receives the fasteners such that the engaging portion of the mullion bracket is secured to the mullion.

In some implementations, the fasteners are threaded fasteners that are each received in a threaded hole in the engaging portion of the mullion bracket.

In some implementations, a portion of the flange passes through a notch in the frame segment.

In some implementations, the flange includes a front portion extending forward from the middle portion.

In some implementations, the flange includes a rear portion extending rearward from the middle portion.

In some implementations, the refrigerated enclosure includes a gasket between the flange and the end of the mullion.

Another aspect of the invention features a bracket for attaching a mullion to a frame. The bracket includes a mullion-engaging portion that couples with the mullion, a frame-engaging portion that couples with a frame segment, a middle portion between the mullion-engaging portion and the frame-engaging portion, and a flange projecting from the middle portion. The flange couples with one end of the mullion such that air flow between an interior space of the mullion and the other side of the flange is inhibited.

In some implementations, the middle portion of the mullion bracket includes a rectangular cross section. The flange projects from the middle portion along all of the edges of the middle portion.

In some implementations, the flange includes a flat rim.

In some implementations, the mullion-engaging portion includes a rectangular body that fills a portion of the interior space of the mullion.

In some implementations, the frame-engaging portion includes a plate that couples with a wall of a frame segment.

Another aspect of the invention features a bracket for attaching a mullion to a frame that includes a mullion engaging portion that couples with the mullion and a frame-engaging portion that couples with one or more frame segments. The body of the mullion-engaging portion of the mullion bracket couples with one or more lateral walls of the mullion.

In some implementations, the body of the mullion-engaging portion receives a pair of opposing fasteners to secure the mullion to the bracket.

In some implementations, each one of the pair of opposing fasteners passes through one of the lateral walls of the mullion.

In some implementations, the mullion-engaging portion includes one or more threaded holes that receive the opposing fasteners.

In some implementations, the mullion-engaging portion(s) include one or more inserts in the body that receive the fasteners.

In some implementations, the body includes a barrier portion that inhibits air flow between the interior space of the mullion and space outside the mullion.

In some implementations, the barrier portion fills an interior space of the mullion to form a barrier between the interior space and the other side of the body.

Another aspect of the invention features a method of connecting a mullion with a frame segment that includes: inserting a portion of the bracket into an interior space of the mullion such that a flange of the mullion bracket contacts an end surface of the mullion; securing the mullion to the mullion bracket with the flange in contact with the end of the mullion and such that air flow between an interior space of the mullion and the other side of the flange is inhibited; and securing the mullion bracket to the frame segment.

Another aspect of the invention features a method of connecting a mullion with a frame segment that includes: inserting an engaging portion of a bracket into an interior space of the mullion such that the engaging portion is between opposing lateral walls of the mullion; securing the engaging portion of the mullion bracket to the lateral walls of the mullion; and securing the mullion bracket to the frame segment.

In some implementations, the method includes installing a fastener through each of the opposing lateral walls of the mullion and into the engaging portion of the mullion bracket.

The concepts described herein may provide several advantages. For example, implementations of the invention may provide a frame with improved thermal efficiency. Implementations may prevent or minimize condensation build up on door sealing surfaces. Implementations may provide for a more positive thermal seal between a thermal frame and a door.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

In some implementations, a mullion bracket provides as a thermal barrier between the mullion and the frame into which the mullion is connected. The mullion includes a perimeter flange between the mullion and the frame. The bracket can restrict air from passing between the door frame and the mullion. In some cases, a rectangular block of the mullion bracket can be inserted into a corresponding opening in the mullion. The block of the mullion bracket is secured to the mullion by way of opposing fasteners in the lateral walls of the mullion.

In some implementations, a mullion has thickened sidewalls that reduce thermal transference from front to back of the mullion. Thermally insulating material, such as foam board, can be placed on the mullion sides. The mullion can have co-extruded portions, one of the co-extruded portions being of a lower density than the other co-extruded portion. The lower density material for the mullion may be, for example, a cellular material or ABS foam. The lower-density co-extruded portion is on the contact-plate side of the mullion. The lower-density co-extruded portion can receive a heater wire and zipper and serves as a thermal break. In cases where the co-extruded portion includes a heater wire channel, a separate component for retaining the heater wire can sometimes be eliminated.

Figure 1:
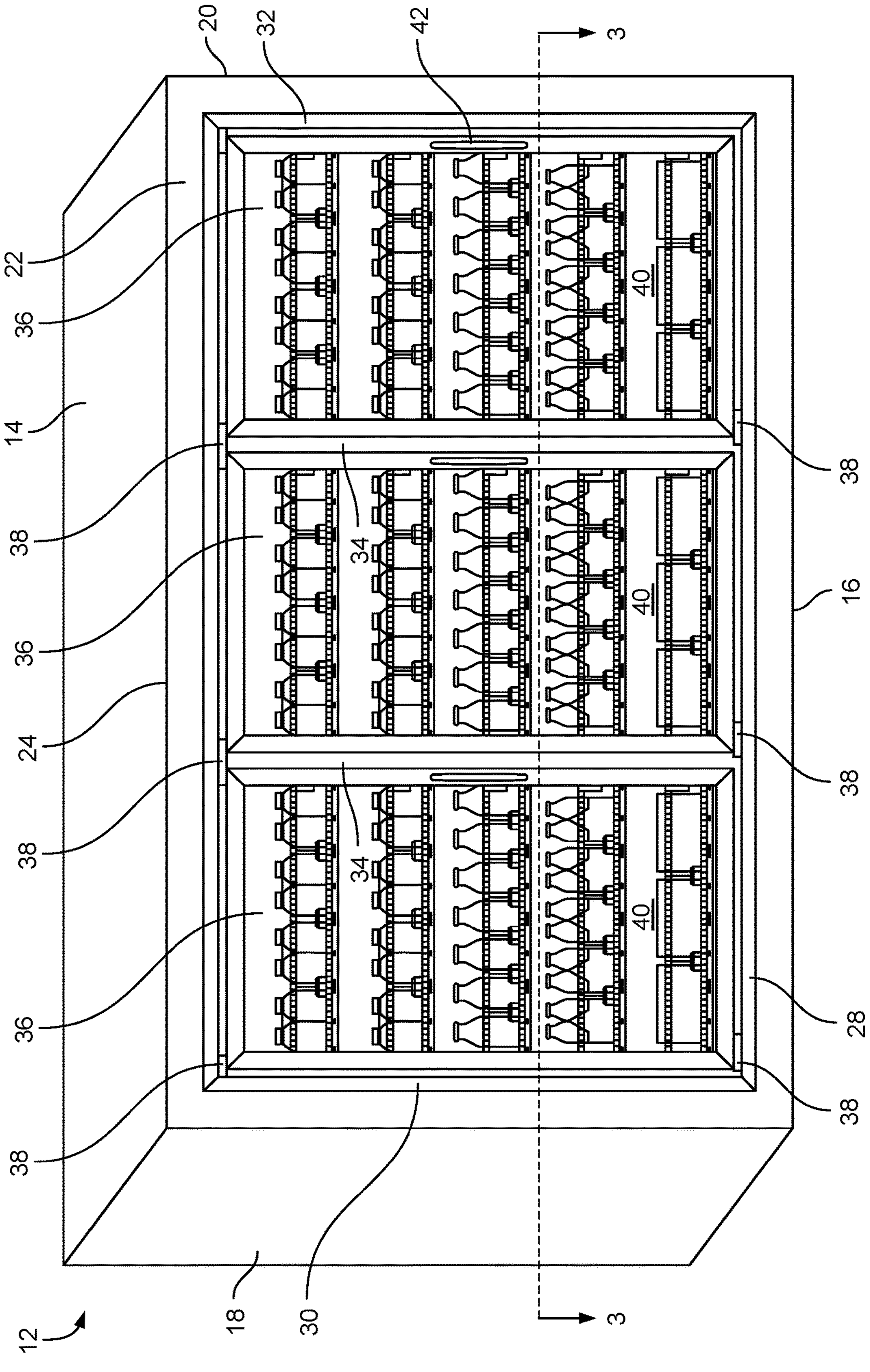
FIG. 1 is a perspective view of a refrigerated enclosure having multiple doors supported by a frame.
Figure 2:
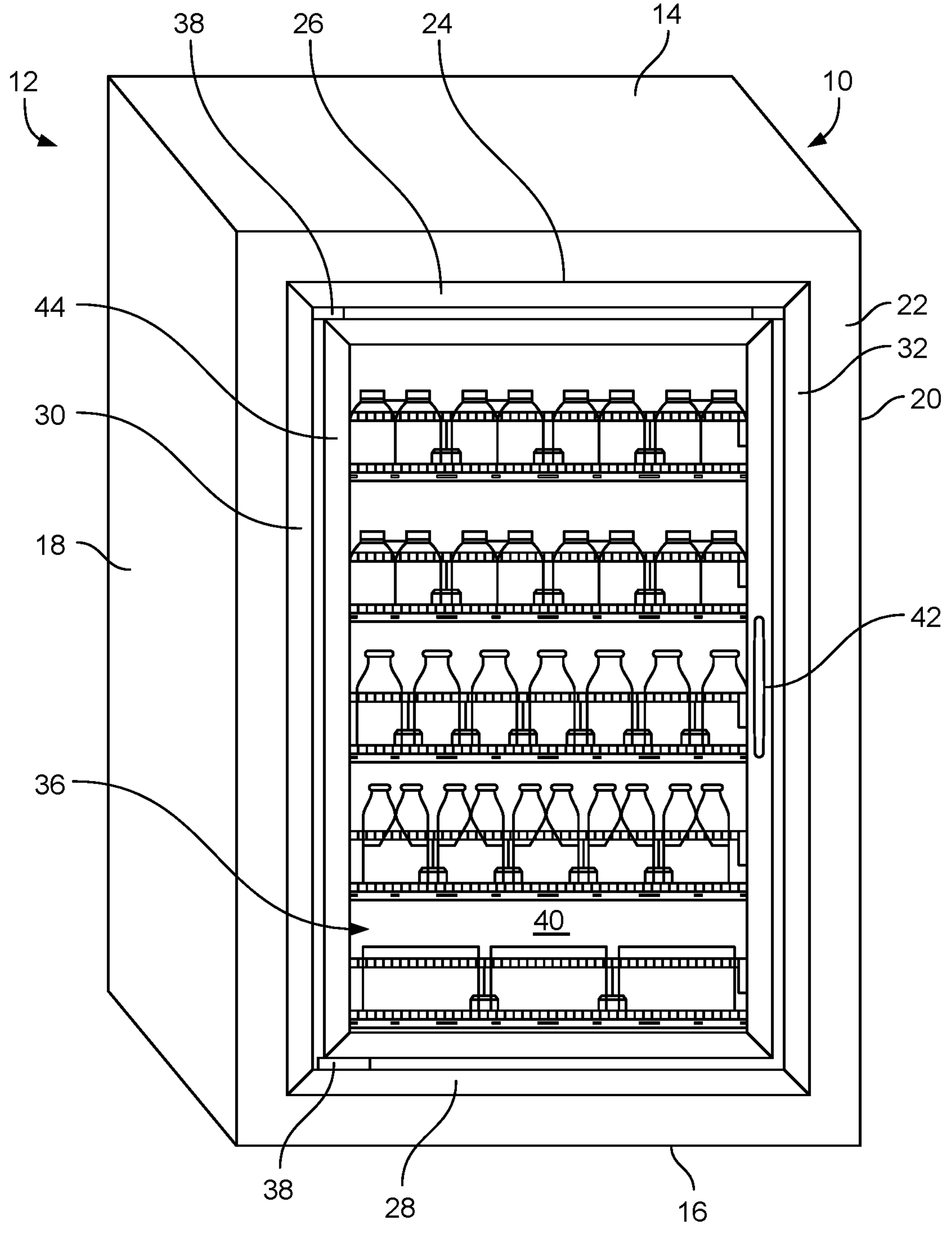
FIG. 2 is a perspective view of a refrigerated enclosure having a single door supported by a frame.

FIGS. 1-2 show an exemplary refrigerated enclosure 10. Refrigerated enclosure 10 may be a refrigerator, freezer, or other enclosure defining a temperature-controlled space. In some implementations, refrigerated enclosure 10 is a refrigerated display case. For example, refrigerated enclosure 10 may be a refrigerated display case or refrigerated merchandiser in grocery stores, supermarkets, convenience stores, florist shops, and/or other commercial settings to store and display temperature-sensitive consumer goods (e.g., food products and the like). Refrigerated enclosure 10 can be used to display products that must be stored at relatively low temperatures and can include shelves, glass doors, and/or glass walls to permit viewing of the products supported by the shelves. In some implementations, refrigerated enclosure 10 is a refrigerated storage unit used, for example, in warehouses, restaurants, and lounges. Refrigerated enclosure 10 can be a free standing unit or "built in" unit that forms a part of the building in which refrigerated enclosure 10 is located.

Refrigerated enclosure 10 includes a body 12. Body 12 includes a top wall 14, a bottom wall 16, a left side wall 18, a right side wall 20, a rear wall (not shown), and a front portion 22 defining a temperature-controlled space. Front portion 22 includes an opening into the temperature-controlled space. Thermal frame 24 is can be mounted at least partially within the opening. Thermal frame 24 includes a plurality of perimeter frame segments (i.e., a header or top frame segment 26, a sill or bottom frame segment 28, a left side frame segment 30, and a right side frame segment 32) forming a closed shape along a perimeter of the opening. In some implementations, thermal frame 24 includes one or more mullion frame segments 34 dividing the opening into multiple smaller openings. For example, FIG. 1 illustrates a three-door assembly with a pair of mullion frame segments 34 extending between top frame segment 26 and bottom frame segment 28 to divide the opening into three smaller openings. Each of the smaller openings may correspond to a separate door 36 of the three-door assembly. In other implementations, mullion frame segments 34 may be omitted. For example, FIG. 2 illustrates a one-door assembly wherein thermal frame 24 includes perimeter frame segments 26-32 but not mullion frame segments 34. In some implementations, thermal frame 24 includes include top frame segment 26 and bottom frame segment 28 with no side frame segments 30 or 32. In such implementation, thermal frame 24 may include one or more mullion frame segments 34 depending, for example, on the size of the refrigerated enclosure in which thermal frame 204 is to be installed and the number of doors.

Refrigerated enclosure 10 includes one or more doors 36 pivotally mounted on the thermal frame 24 by hinges 38. In some implementations, the doors 36 are sliding doors configured to open and close by sliding relative to the thermal frame 24. The example doors 36 illustrated in FIGS. 1 and 2 include panel assemblies 40 and handles 42. Referring to FIG. 2, thermal frame 24 is includes a series of contact plates 44. Contact plates 44 are be attached to a front surface of thermal frame 24 and provide a sealing surface against which doors 36 rest in the closed position. For example, doors 36 may include a gasket or other sealing feature around a perimeter of each door 36. The gaskets may employ a flexible bellows and magnet arrangement, which, when the doors 36 are closed, engage contact plates 44 to provide a seal between doors 36 and thermal frame 24. The thermal frames provide a thermally conductive path from the frame segments 26-32, for maintaining maintains the temperature of the contact plates 44 at or close to the temperature of the external environment (e.g., the environment outside of the refrigerated enclosure 10) and to aid in preventing condensation from forming on the contact plates 44. Preventing condensation on the contact plates may provide for a more positive seal between the contact plates 44 and a magnetic gasket on the door, thereby improving the thermal properties of the refrigerated enclosure 10.

Figure 3:
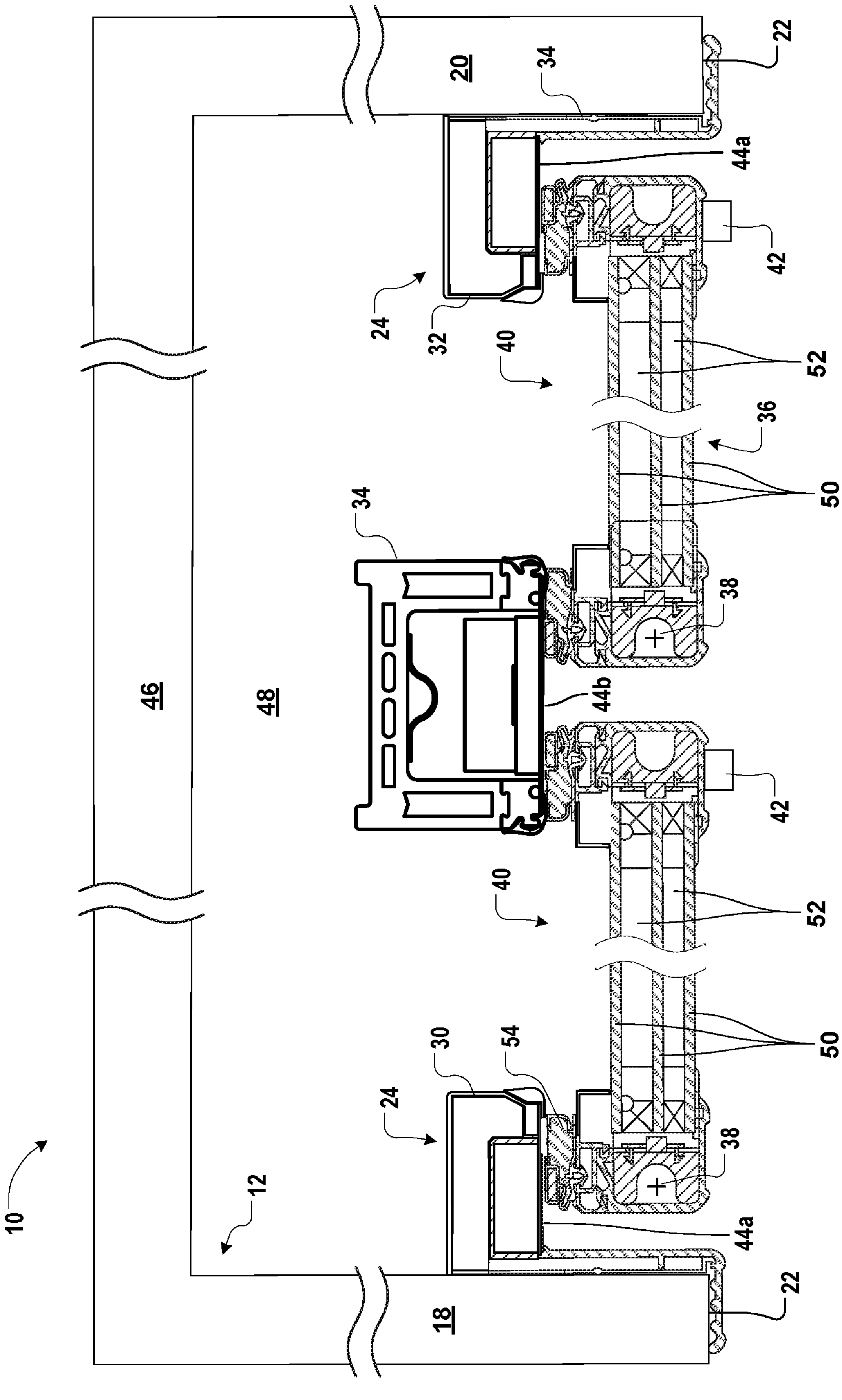
FIG. 3 is a cross-sectional view showing an example refrigerated enclosure with two doors and a mullion according to implementations of the present disclosure.

FIG. 3 illustrates a cross-sectional view of the refrigerated enclosure 10 taken along the line 3-3 in FIG. 1. FIG. 3 illustrates the pair of side walls 18 and 20 of the refrigerated enclosure 10 extending rearward from front portion 22, and a rear wall 46 extending between side walls 18 and 20 to define a temperature-controlled space 48 within the body 12.

In FIG. 3, refrigerated enclosure 10 is shown as a two-door assembly with a pair of doors 36 positioned in an opening in front portion 22. Refrigerated enclosure 10 may have two doors 36 (as shown in FIG. 3), a lesser number of doors 36 (e.g., a single door as shown in FIG. 2), or a greater number of doors 36 (e.g., three or more doors as shown in FIG. 1). Each door 36 includes a panel assembly 40 and a handle 42. Applying a force to handle 42 causes the corresponding door 36 to rotate about hinges 38 between an open position and a closed position. In some implementations, panel assembly 40 is a transparent or translucent panel assembly through which items within temperature-controlled space 48 can be viewed when doors 36 are in the closed position. For example, panel assembly 40 is shown to include a plurality of transparent or translucent panels 50 with spaces 52 therebetween. The spaces 52 can be sealed and filled with an insulating gas (e.g., argon) or evacuated to produce a vacuum between panels 50. In some embodiments, panel assembly 40 includes opaque panels with an insulating foam or other insulator therebetween. Doors 36 include gaskets 54 attached to a rear surface of doors 36 along an outer perimeter of each door. Gaskets 54 are configured to engage a sealing surface of the contact plates 44*a* and 44*h* (referred to collectively as contact plates 44) when the doors 36 are in the closed position, and to thereby provide a seal between doors 36 and contact plates 44.

The perimeter frame segments 30-32 of the thermal frame 24 are coupled to the body 12 of the refrigerated enclosure 10 by mounting brackets 68. Mounting brackets 68 can be secured to perimeter frame segments 30-32 using one or more connection features (e.g., flanges, notches, grooves, collars, lips, etc.) or fasteners (e.g., bolts, screws, clips, etc.) and may hold perimeter frame segments 30-32 in a fixed position relative to the body 12 of the refrigerated enclosure 10.

Although only two perimeter frame segments 30-32 are shown in FIG. 3, other perimeter frame segments (e.g., header/top frame segment 26 and sill/bottom frame segment 28) may be configured in a similar manner. For example, top frame segment 26 and bottom frame segment 28 may be coupled to the body 12 of the refrigerated enclosure 10 by mounting brackets 68.

The perimeter frame segment assembly includes a perimeter frame segment (i.e., one of frame segments 26-32), a mounting bracket 68, and a contact plate 44.

One or more mullion frame segments 34 extend vertically between top frame segment 26 and bottom frame segment 28. A top portion of mullion frame segment 34 is fastened to a top frame segment 26 and a bottom portion of mullion frame segment 34 is fastened to a bottom frame segment 28.

Mullion Assembly and Mullion Bracket

In some implementations, a rectangular block of a mullion bracket can be inserted into a corresponding opening in a mullion. The block of the mullion bracket is secured to the mullion by way of opposing fasteners in the lateral walls of the mullion.

In some implementations, a mullion bracket has a design to close spaces between mullion, bracket, and frame allowing a better isolation. In one case, the mullion bracket has a body constructed with polymer PA66 30% GF. A larger bracket thickness can improve the isolation between mullion, bracket, and frame. In addition, the mullion bracket can protect the system against air infiltration. In some examples, a bracket perimeter flange blocks air infiltration inside mullion and on the system, resulting in a better system thermal performance.

Figure 4:
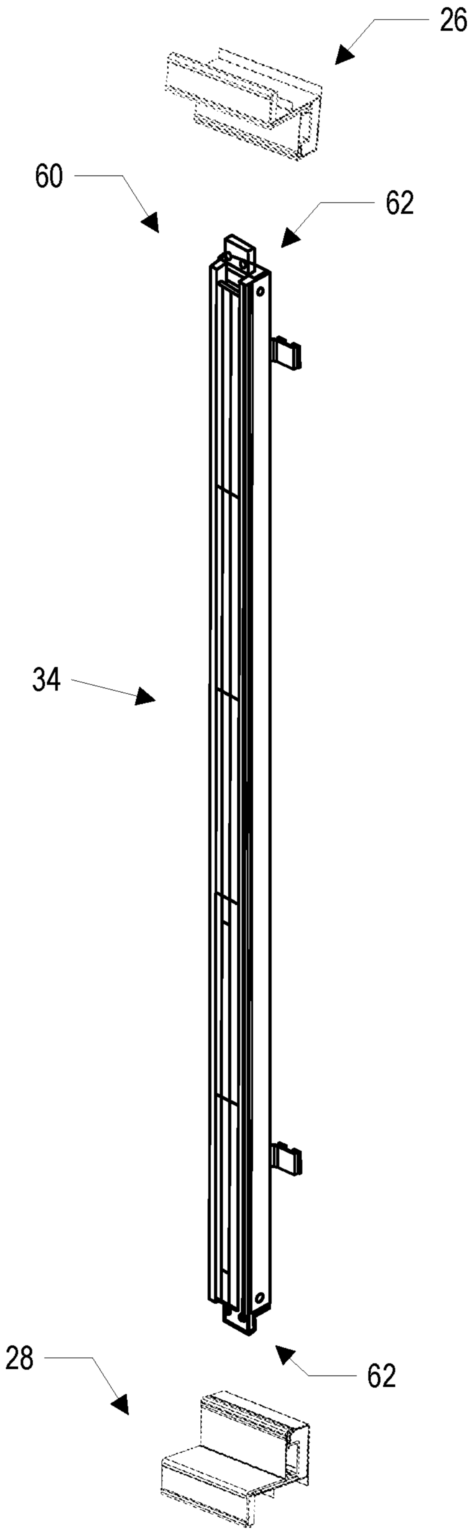
FIG. 4 is a perspective view of a mullion assembly exploded away from representative upper and lower frame segments according to implementations of the present disclosure.

FIG. 4 is a perspective view of a mullion assembly exploded away from representative upper and lower frame segments. Mullion assembly 60 includes mullion frame segment 34 and mullion brackets 62. One of mullion brackets 62 can be used at each of a top rail and a bottom rail to attach the mullion to the frame in vertical orientation between two adjacent doors. The mullion bracket 62 at the bottom rail can be in the opposite orientation (e.g., inverted) compared to the mullion bracket at the top rail. As will be further described below, upper and lower frame segments can include accommodations, such as notches or cutouts, for receiving a portion of a mullion and/or coupling with a mullion bracket. In addition, some portions of the frame segment, such as a backing member, can be omitted in the area of the mullion connection.

Figure 5:
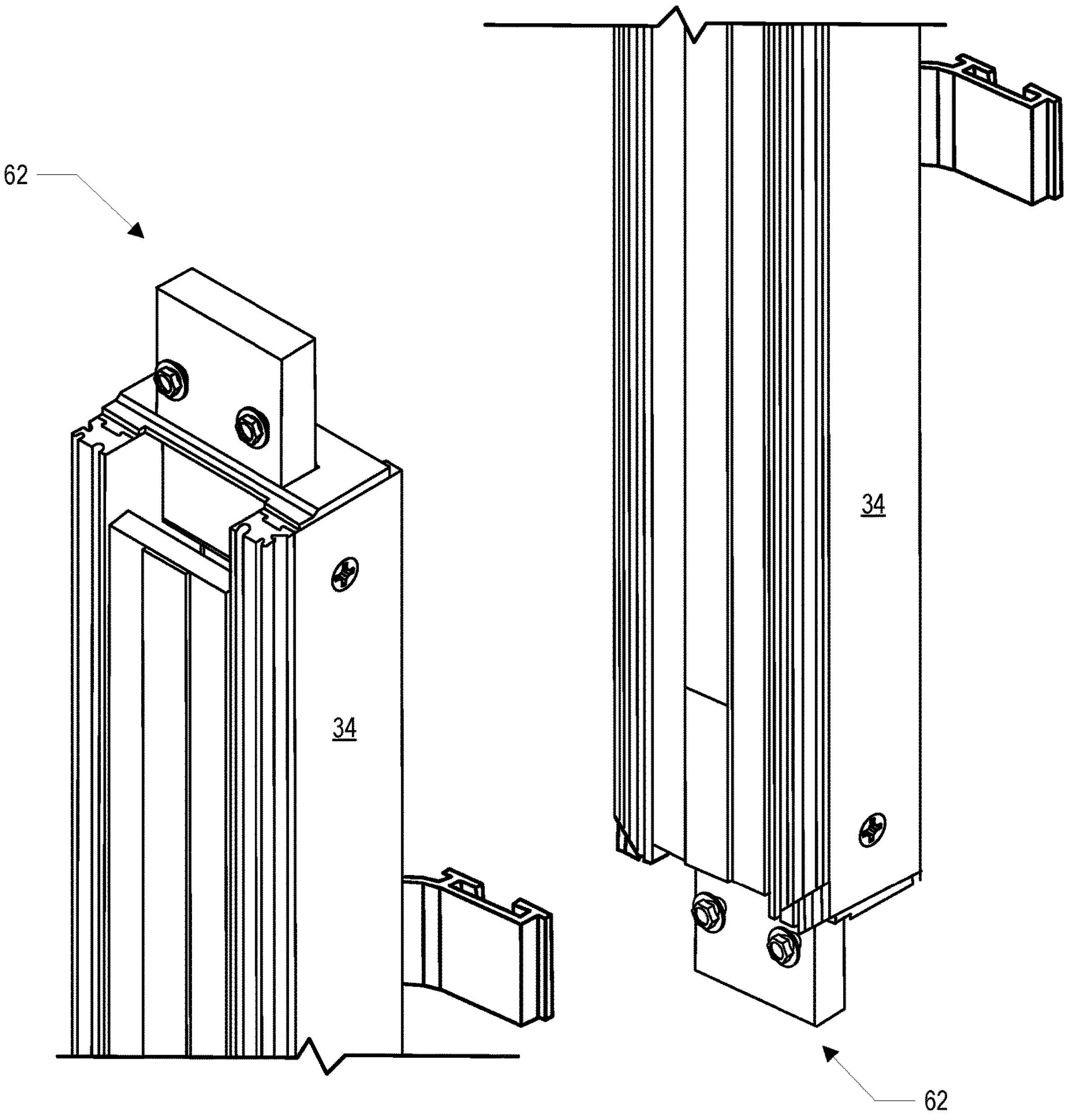
FIG. 5 is a perspective front view of a mullion assembly according to implementations of the present disclosure.

FIG. 5 is a perspective front view of a mullion assembly according to implementations of the present disclosure.

Figure 6:
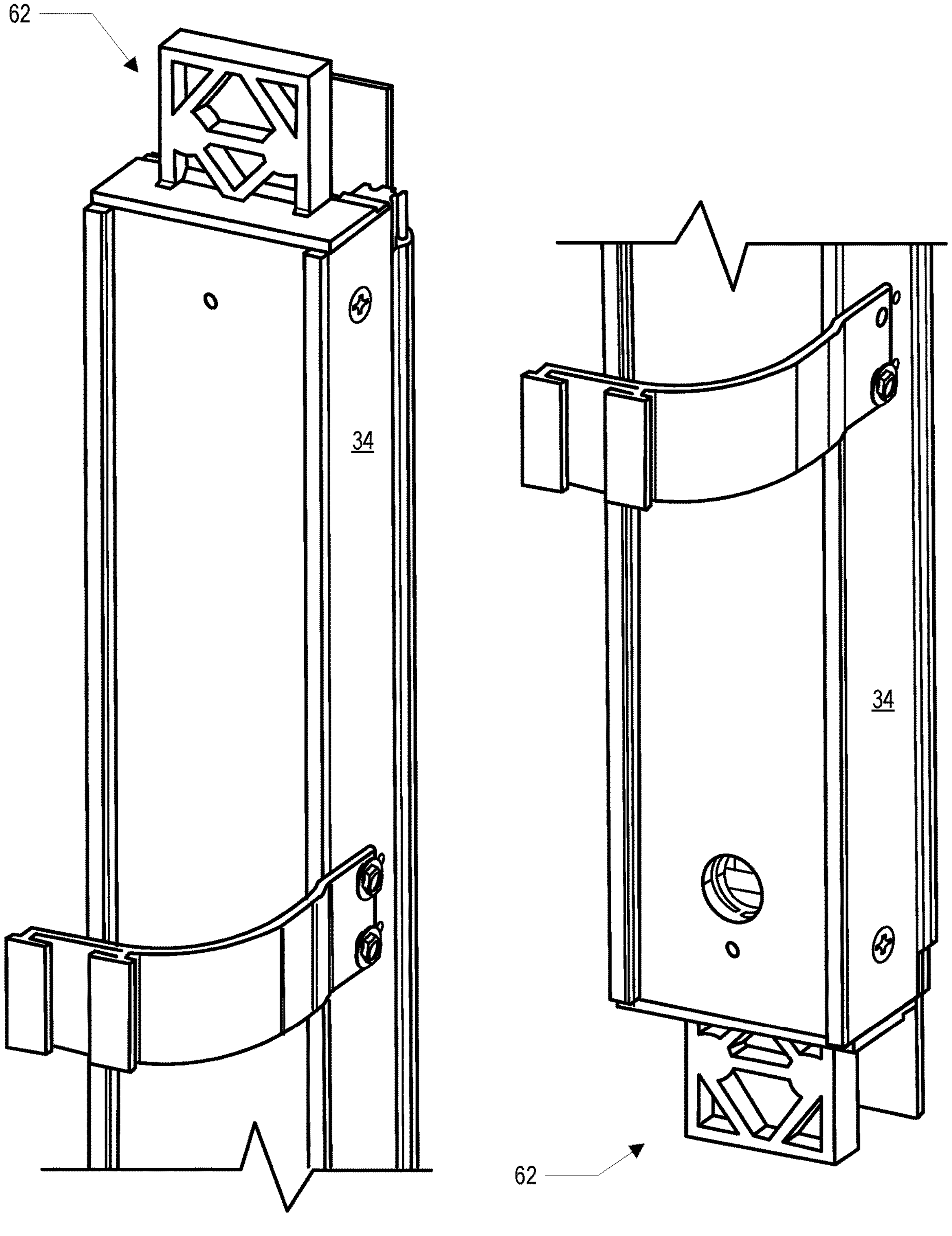
FIG. 6 is a perspective rear view of a mullion assembly according to an illustrative implementation.

FIG. 6 is a perspective rear view of a mullion assembly according to an illustrative implementation.

Figure 7A:
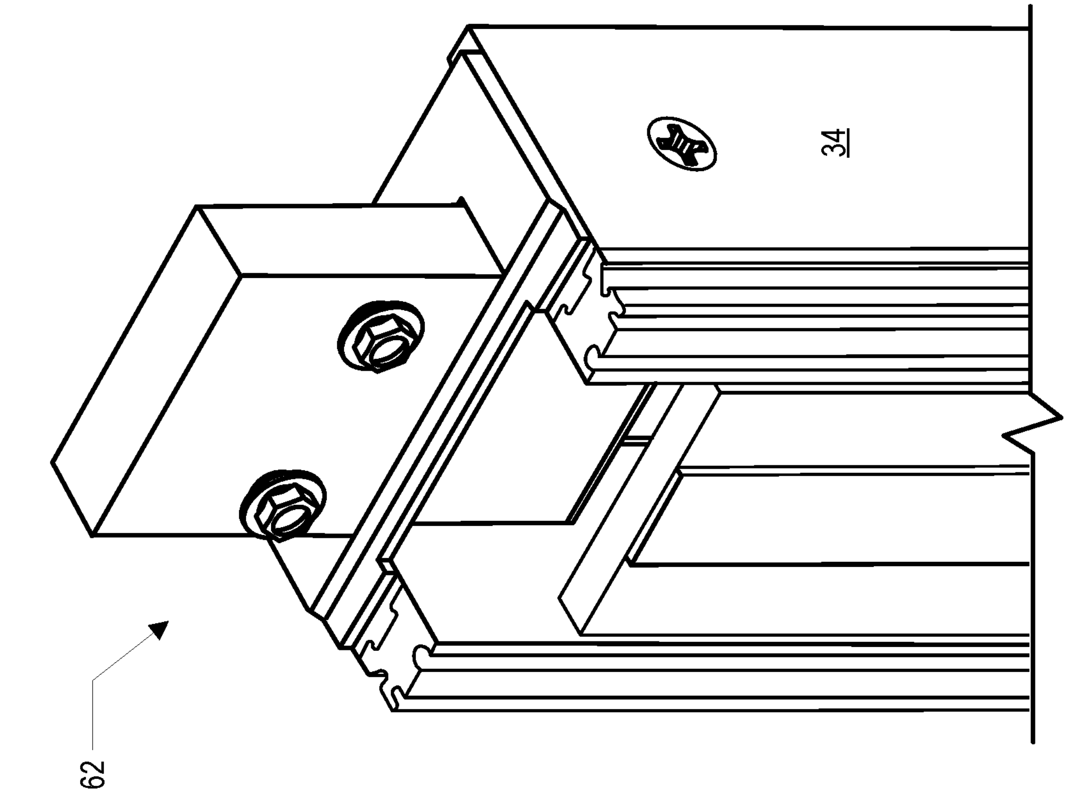
FIGS. 7 and 7A illustrate a mullion assembly including a mullion bracket installed on a mullion frame segment according to implementations of the present disclosure.
Figure 7:
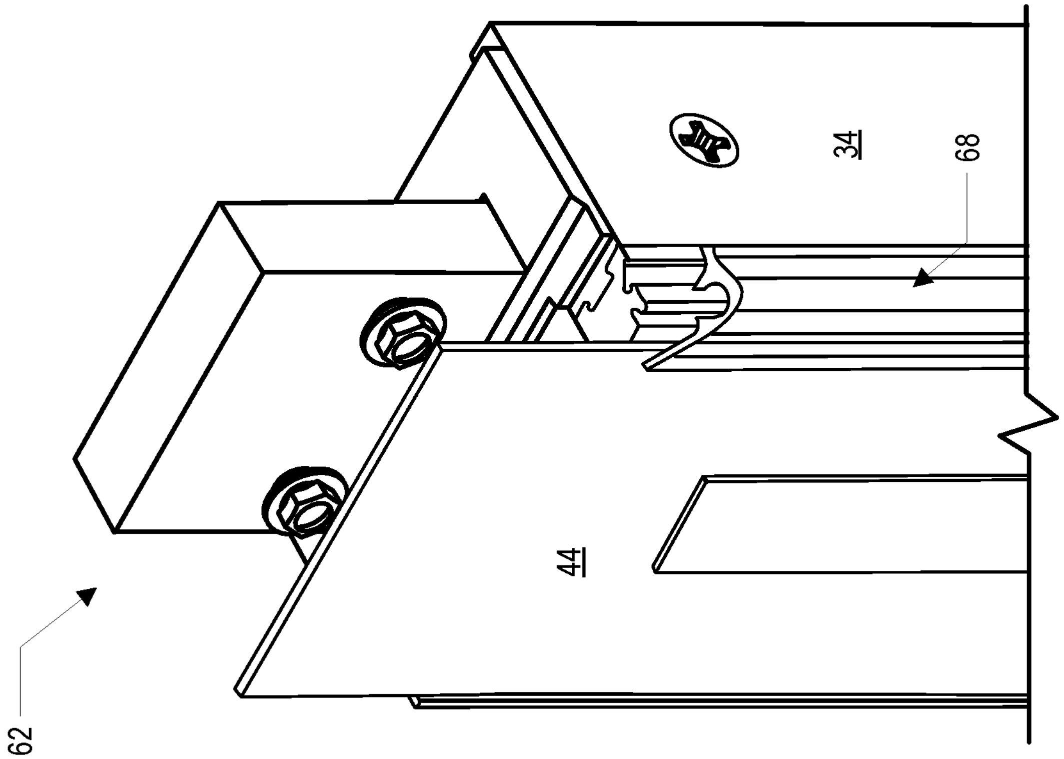

FIG. 7 illustrates a mullion assembly including a mullion bracket installed on a mullion frame segment. FIG. 7A is depicts mullion assembly of FIG. 7, but with the contact plate and zippers omitted for illustrative purposes. One of mullion brackets 62 can be installed in each end of mullion segment 34. As will be further described below, mullion fasteners 64 can be provided on either side of mullion 34 to couple mullion bracket 62 to mullion segment 34. Frame fasteners 66 can be used to secure mullion bracket 62 to a frame segment of refrigerated enclosure 10. Contact plate 44 can be held in place on mullion frame segment 34 by way of zippers 68.

Figure 8:
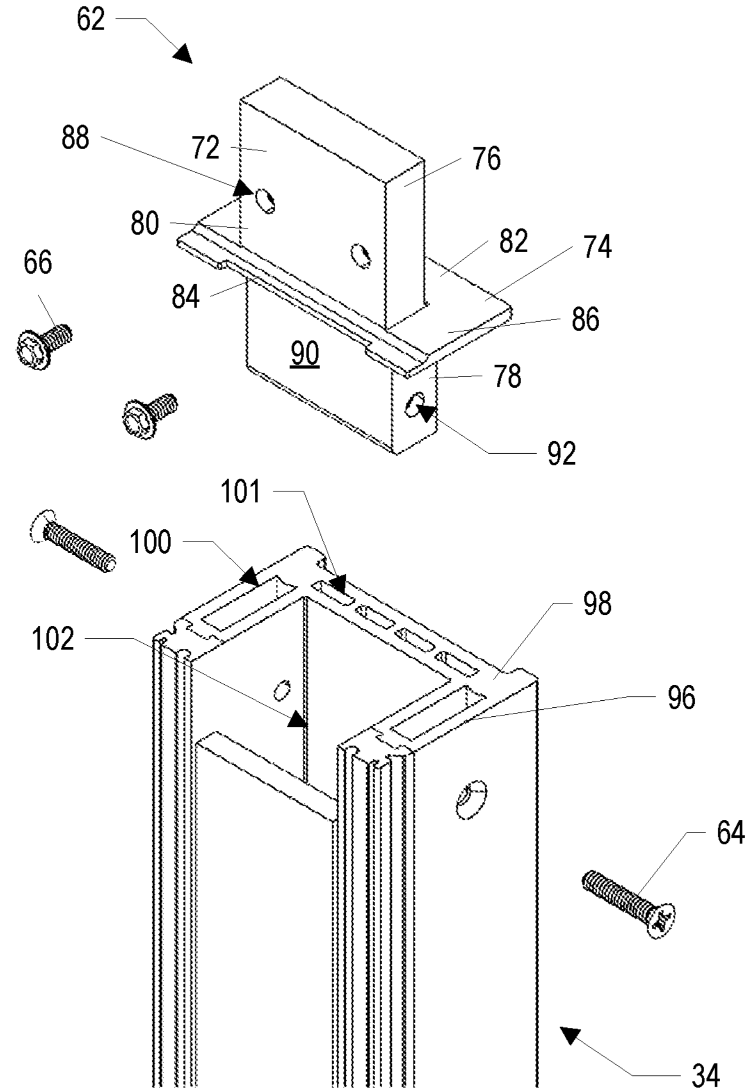
FIG. 8 is a partially exploded view illustrating a bracket for connecting a mullion to a frame according to implementations of the present disclosure.

FIG. 8 is a partially exploded view illustrating a bracket for connecting a mullion to a frame. (Contact plate 44 and zippers 68 are omitted from FIG. 8 for illustrative purposes.) Mullion bracket 62 includes block 72 and perimeter flange 74. The upper portion of block 72 includes frame-engaging portion 76. The lower portion of block 72 includes mullion-engaging portion 78. Perimeter flange 74 goes around middle portion 80 of block 72. Perimeter flange 74 extends from block 72 to the front, rear, left and right. In this example, perimeter flange 74 is in the form of a plate. Perimeter flange 74 includes rear projection 82, front projection 84, and lateral projections 86.

Frame-engaging portion 76 includes holes 88. Frame fasteners 66 can be inserted through holes 88 to secure mullion bracket 62 to a frame segment, such as top frame segment 26 or bottom frame segment 28.

Mullion-engaging portion 78 includes body 90. On each of the opposing lateral sides of body 90, a threaded hole 92 is provided. Each of threaded holes 92 passes through a hole in one of lateral sections 96 of mullion frame segment 34. Each of threaded holes 92 receives one of mullion fasteners 64. Mullion fasteners 64 can be used to secure mullion engaging portion 78 to mullion segment 34.

Perimeter flange 74 may couple on end surface 98 of mullion frame segment 34. Perimeter flange 74 may form a barrier to air flow between interior spaces of the mullion and the other side of the flange (in FIG. 8, the space interior to the mullion would be below perimeter flange 74 when installed on mullion frame segment 34). In various implementations, for example, perimeter flange can block air infiltration into or of pockets 100 and 101, and central interior space 102.

Figure 9:
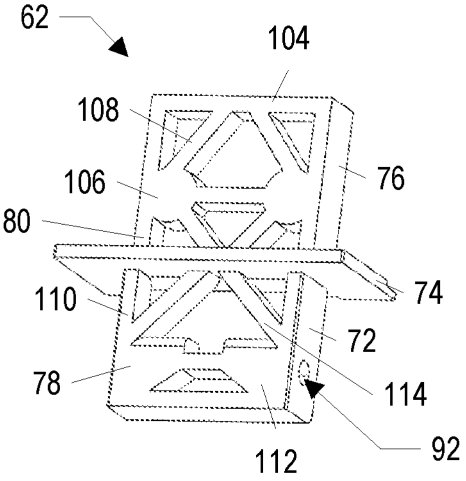
FIG. 9 is a reverse angle perspective view of the mullion bracket according to implementations of the present disclosure.

FIG. 9 is a reverse angle perspective view of the mullion bracket according to an illustrative implementation. Frame engaging portion 76 includes rim 104, bosses 106 and web 108. Bosses 102 house the threaded hole for frame fasteners 64. Rim 104, bosses 106, and web 108 may provide structural reinforcement for the connection between the frame and mullion frame segment 34.

Mullion engaging portion 78 includes rim 110, bosses 112 and web 114. Bosses 112 house the threaded hole for mullion fasteners 66. Rim 110, bosses 112 and web 114 may provide structural reinforcement for the connection between the frame and mullion frame segment 34.

In the example described above with respect to FIGS. 8 and 9, the bracket includes a threaded hole that receives a threaded fastener. The threads for the hole can be provided directly in the body (such as by a tapped hole), or in the form of a separate component such as a nut or threaded insert. In other implementations, a hole for a fastener can be thru-holes for a screw or pin.

In some implementations, the mullion bracket has nuts and/or metal soles inserted inside the body of the bracket. Inserts may allow a rigid and stable fastening between bracket and mullion, and between bracket and frame.

Figure 10:
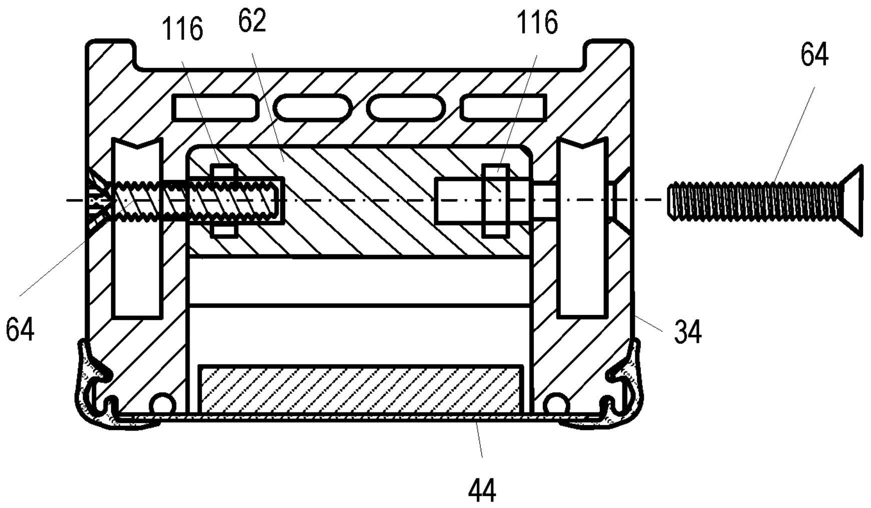
FIG. 10 is a cross sectional view a connection of a mullion bracket with a mullion according to implementations of the present disclosure.

FIG. 10 is a cross sectional view a connection of a mullion bracket with a mullion according to implementations of the present disclosure. Mullion bracket 62 includes inserts 116. Inserts 116 can be in the form of nuts. Mullion fasteners 64 pass through each of the opposing lateral sections of mullion frame segment 38. Mullion fasteners 64 can be threaded into inserts 116 to secure mullion bracket 62 to mullion frame segment.

Figure 11:
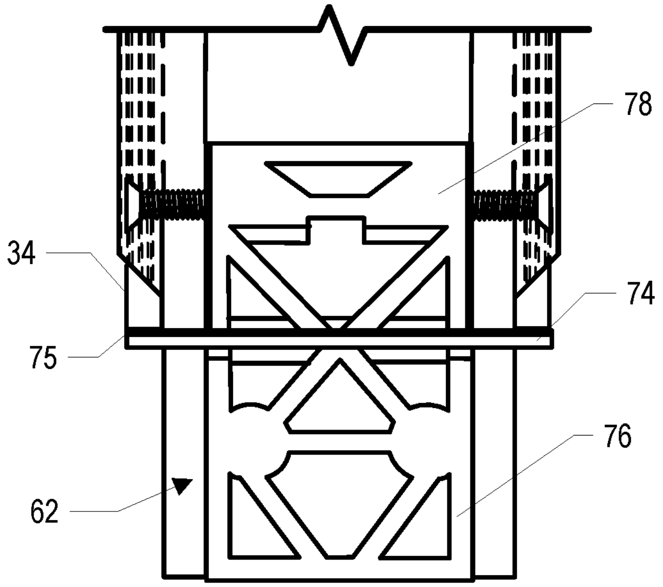
FIG. 11 depicts a mullion bracket installed at the bottom of a mullion according to implementations of the present disclosure.

FIG. 11 depicts a mullion bracket installed at the bottom of a mullion. In this case, frame-engaging portion 76 extends downward from perimeter flange 74 and mullion engaging portion 78 extends upward from perimeter flange 74. In the example shown in FIG. 11, a gasket 75 is provided between mullion frame segment 34 and perimeter flange 74.

In various implementations described above, a mullion bracket is secured to a mullion by way of opposing threaded fasteners on either side of the bracket. In other implementations, however, other components or arrangements can be used to secure a bracket to a mullion or to a frame member. As one example, the bracket can be secured by a pin that enters the mullion bracket on either side. As another example, the bracket can be secured by a pin, screw, or bolt that passes through the bracket. In some implementations, a pin or threaded fastener can pass all the way through the bracket and/or all the way through both of the opposing walls of the mullion Examples of other components that can be used to secure a bracket to a mullion or frame include rivets, bars, tubes, nuts, or clips.

In various implementations described above, a bracket is fastened on the lateral portions of a mullion. In other implementations, a bracket can be secured to the mullion on the back or front walls in addition to, or instead of, the lateral sections.

In various implementations described above, two fasteners are used to attach the bracket to the mullion. In other implementations, only a single fastener can be used, or more than two fasteners can be used.

Figure 12:
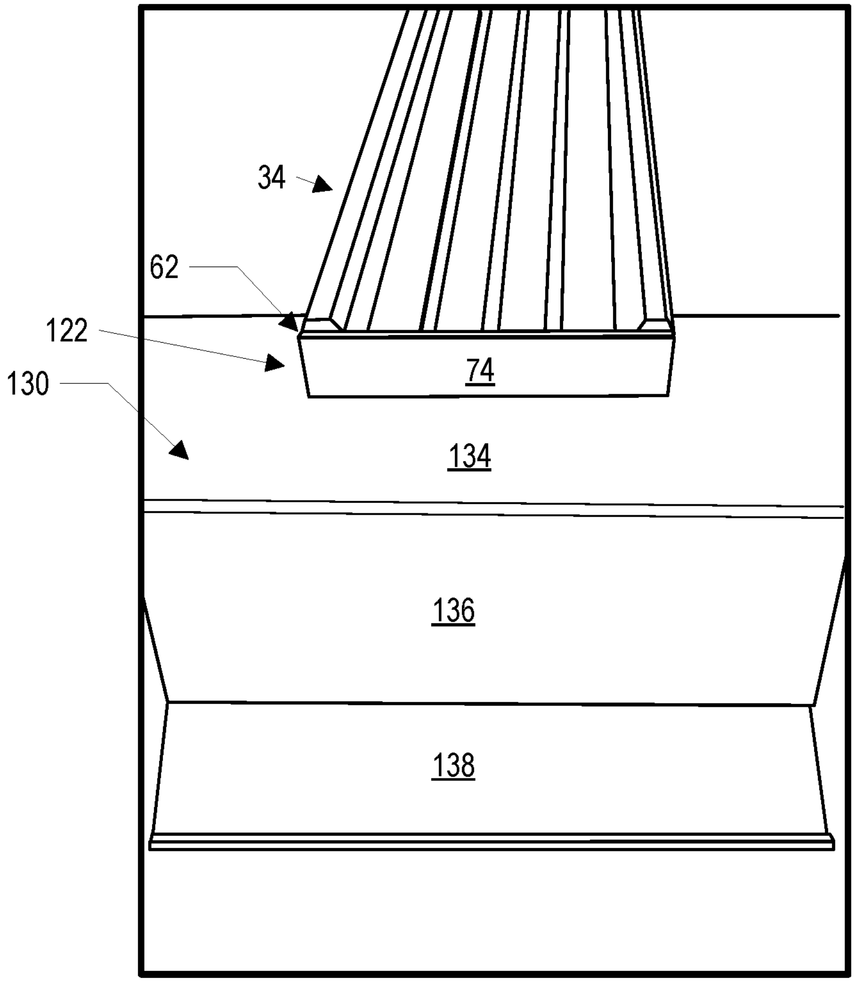
FIG. 12 is a view from above and behind a frame segment illustrating a connection between a frame segment and a mullion according to implementations of the present disclosure.

FIG. 12 is a view from above and behind a frame segment illustrating a connection between a frame segment and a mullion. Main frame member 130 includes rear wall 134, middle wall 136 and forward flange 138. Main frame member 130 can be coupled to the front of a refrigerated enclosure. Mullion frame segment 34 may be secured to main frame member 130 by way of mullion bracket 62. Mullion bracket 62 may pass through notch 122 is rear wall 132 of main frame member 130.

As illustrated in FIG. 12, perimeter flange 74 of mullion bracket 62 least partially caps the end of mullion frame segment 34 and forms a barrier between interior spaces of mullion frame segment 34 and the other side of perimeter flange 74. In this case, the rear and lateral sections of perimeter flange can inhibit air infiltration between the air outside the mullion and the space interior to the mullion.

Figure 13:
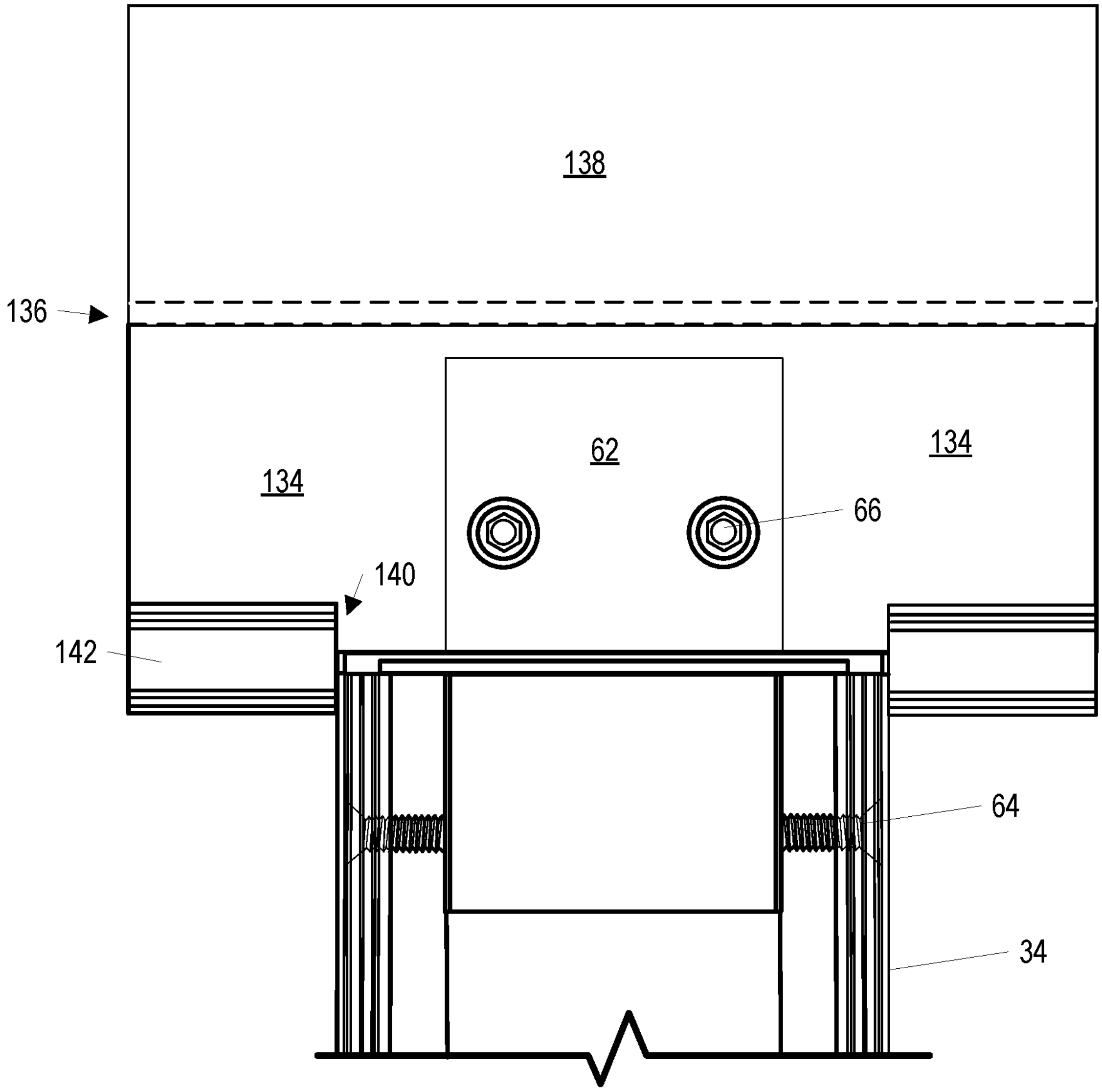
FIG. 13 is a view from the front of a frame segment illustrating a connection between a frame segment and a mullion according to implementations of the present disclosure.

FIG. 13 is a view from the front of a frame segment illustrating a connection between a frame segment and a mullion. Mullion assembly 60 can extend through a notch 140 in interior wall 142 of main frame member 130. Notch 140 can be contiguous with notch 122 shown in FIG. 12). Mullion bracket 60 can be secured to rear wall 134 of main frame member 130. The front surfaces of main frame member 130 and mullion frame segment 34 can be coplanar such that the contact plates attached to the front surfaces of the main frame member and the mullion frame segment are co-planar.

Figure 14:
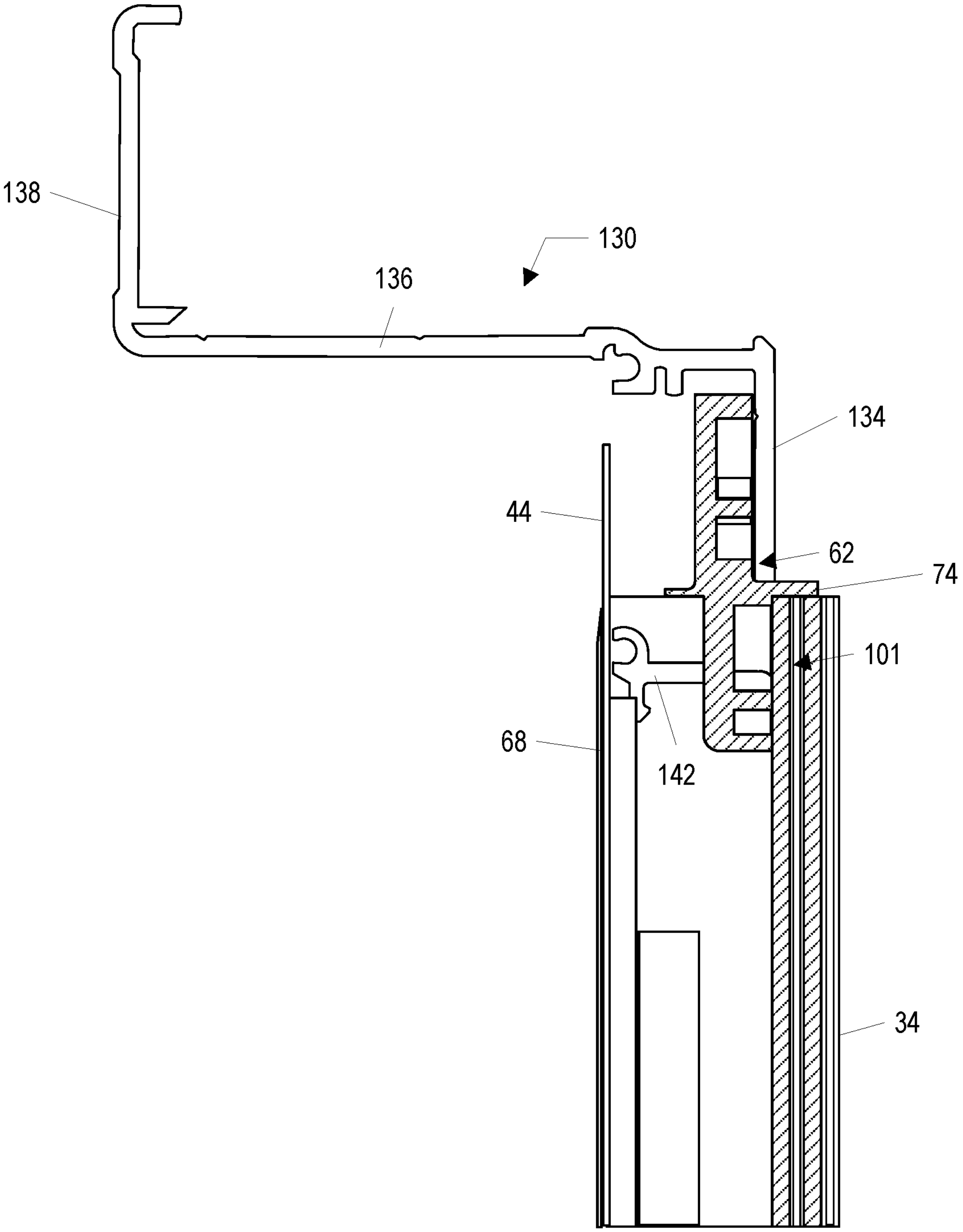
FIG. 14 is cross sectional a side view illustrating a connection between a frame segment and a mullion according to implementations of the present disclosure.

FIG. 14 is a cross sectional side view illustrating a connection between a frame segment and a mullion. Mullion bracket 62 is secured to rear wall 134 of main frame member 130 (frame fasteners 66 are omitted from FIG. 14 for clarity). The rear and lateral sections of perimeter flange can inhibit air infiltration between the air outside the mullion and the space interior to the mullion. As can be seen in FIG. 14, for example, the rear portion of perimeter flange 74 can cap off pockets 101 in the rear section of mullion frame segment 34.

Figure 15:
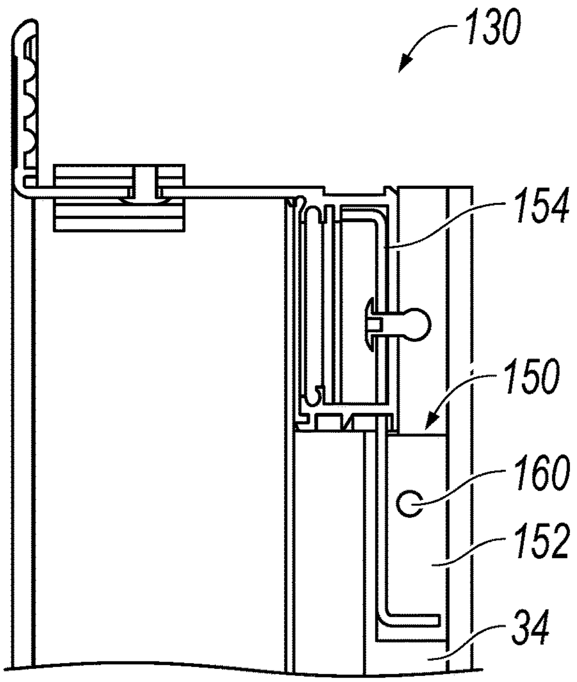
FIG. 15 through 17 illustrate an alternate implementation of a bracket for connecting a mullion to a frame.
Figure 16:
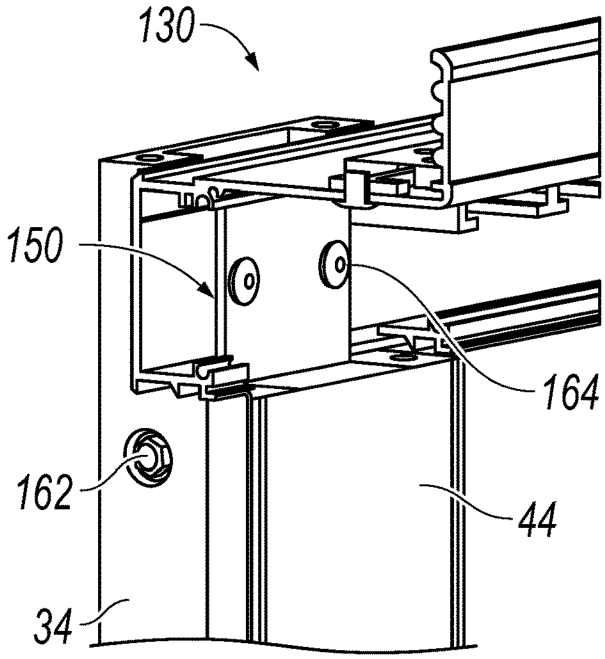
Figure 17:
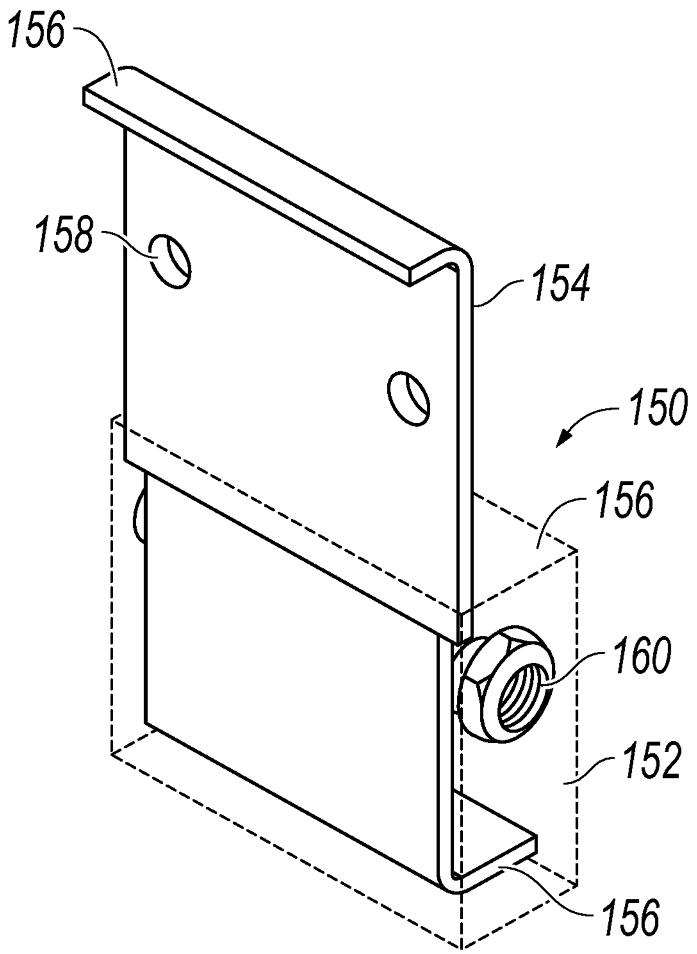

FIG. 15 through 17 illustrate an alternate implementation of a bracket for connecting a mullion to a frame. Bracket 150 includes block 152 and plate 154. Plate 154 includes tabs 156 and holes 158. The mullion-end of bracket 150 is housed within block 152. Lateral receiving holes 160 are provided on either side of block 152. Each of lateral receiving holes 160 can receive a fastener 162 that passes through the lateral sections of mullion frame segment 34. The frame-end of plate 154 can be secured to main frame member 130 by way of fasteners 164. Block 152 can serve as a barrier to air infiltration into and out of mullion frame segment 34. In a similar manner as described above with respect to FIGS. 8 and 9, receiving holes 160 can be threaded or not threaded, and can include a nut or insert that couples to a fastener (for example, an inserted nut as shown in FIG. 17)

Mullion

Figure 18:
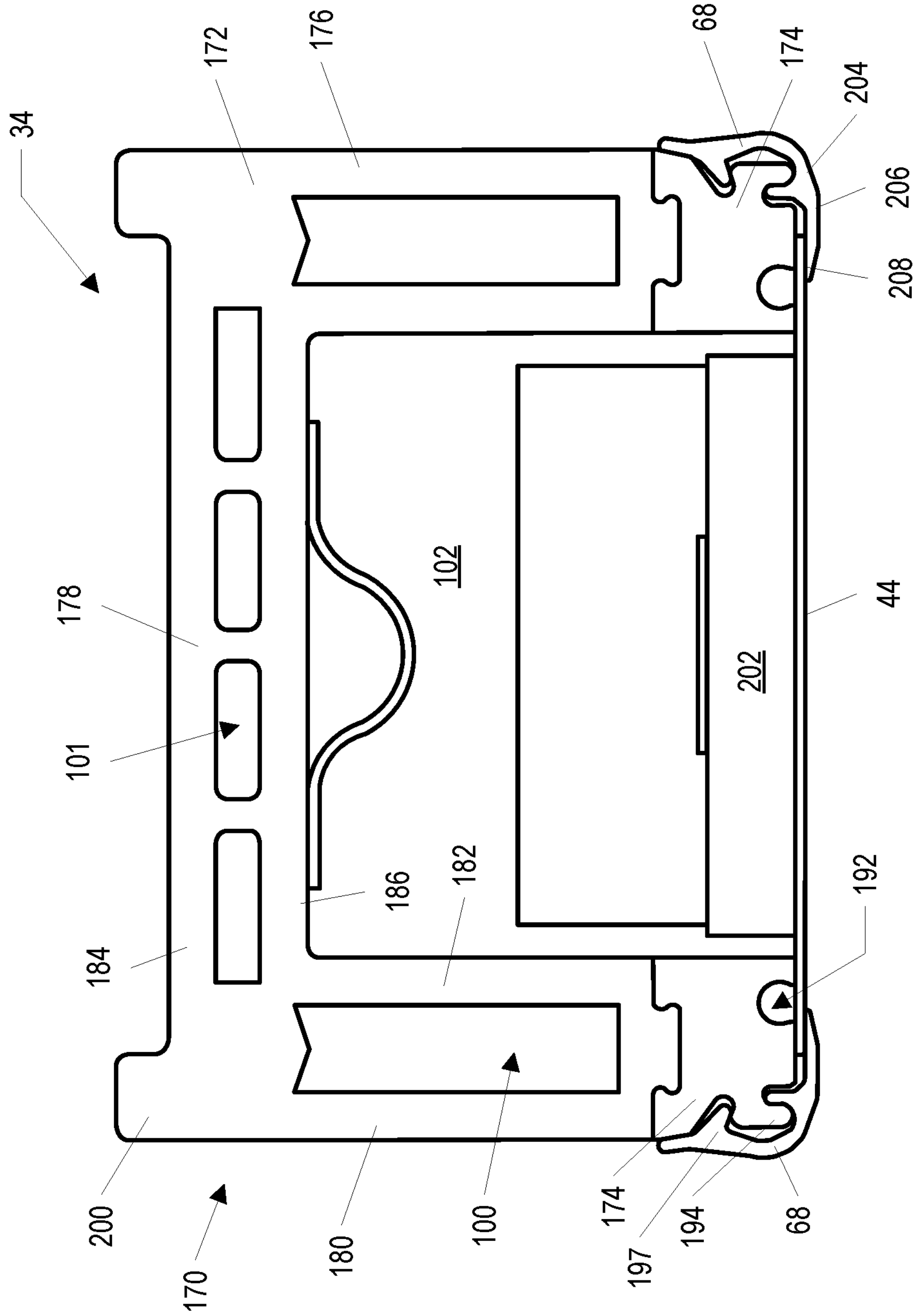
FIG. 18 is a cross sectional view of a mullion according to implementations of the present disclosure.

FIG. 18 is a cross sectional view of a mullion according to implementations of the present disclosure. Mullion frame segment 34 includes mullion body 170, contact plate 44, and zippers 68. Body 170 includes base 172 and front pads 174. Base 172 includes lateral sections 176 and rear section 178. An interior space 196 is defined between lateral sections 176, bounded to the rear by an interior surface of rear section 178.

Each of lateral sections 176 includes an exterior lateral wall 180 and an interior lateral wall 182. Exterior lateral wall 180 and interior lateral wall 182 are spaced apart from one another. In each of lateral sections 176, pocket 100 is formed between exterior lateral wall 180 and interior lateral wall 182.

Rear section 178 includes an exterior rear wall 184 and an interior rear wall 186. Exterior rear wall 184 and interior rear wall 186 are spaced apart from one another. Pockets 101 are formed between exterior lateral wall 184 and interior lateral wall 186.

Each of pads 174 includes a channel 192 and zipper engaging portion 194. Channel 192 can receive a heater wire. Zipper engaging portion 194 can couple with zipper 68 such that projection 197 of zipper 68 engaging on zipper engaging portion 194. Projections 200 extend in a rearward direction from a rear surface of mullion body 170.

The interior of mullion frame segment 34 can include one or more insulating members. In FIG. 18, for example, insulating member 202 is against contact plate 44 between the opposing lateral sections 172 of body 170. Exterior lateral wall 180 and interior lateral wall 182 are spaced apart from one another. In each of lateral sections 176, pocket 100 is formed between exterior lateral wall 180 and interior lateral wall 182.

In some implementations, different portions of a mullion segment a co-extruded with one another. In the mullion shown in FIG. 18, front pads 174 can be co-extruded with base 172. Front pads 174 can be of a lower density than the density of base 172. In some implementations, front pads 174 are made of co-extruded cellular material.

In some implementations, a thickness of lateral sections 176 is increased to reduce heat transfer between the interior and external surface of the mullion. In one implementation, the thickness of lateral sections 176 is at least about ⅜ inches. In one implementation the thickness of lateral section 176 is about ½ inches. In one implementation, the thickness of rear section 178 is at least about ⅜ inches. In one implementation, the thickness of one or more of interior and exterior walls is at least about ⅛ inches.

In operation, front pads 174 serve as a thermal break between base 174 and contact plate 44. The thermal break may help maintain a higher temperature on the front of contact plate 44 such that condensation at the location of the door seal is inhibited. For example, referring to FIG. 3, condensation may be reduced or eliminated where gasket 54 meets contact plate 44.

In some implementations, a method of making a mullion includes co-extruding a two or more portions of the mullion. Different portions of the mullion may be of different materials, densities, or both. In some implementations, a portion of mullion is co-extruded with a cellular material having a lower density that other portions of the mullion. In one example, a portion of the mullion that is in contact with a contact plate is co-extruded to have a different density than other portions of the mullion.

In some implementations, an external finish is provided over body 170. The external finish may decrease air infiltration and form a thermal barrier. In some cases, an external finish eliminates a need for a cover for the mullion.

Zipper 68 includes retaining rim 204. Retaining rim 204 can lie flat on contact plate 44. In this manner, there may be no gap between the rear surface of the zipper and the retained front surface of contact plate 44. Retaining rim 204 of zipper 68 include a zipper front surface 206. Zipper front surface 206 can be flat. Retaining rim 204 of zipper 204 also includes tapered leading edge 208.

In various implementations, some or all sections of mullion body include two or more walls spaced from one another. For example, as illustrated in FIG. 18, lateral sections 176 have interior and exterior walls.

Figure 19:
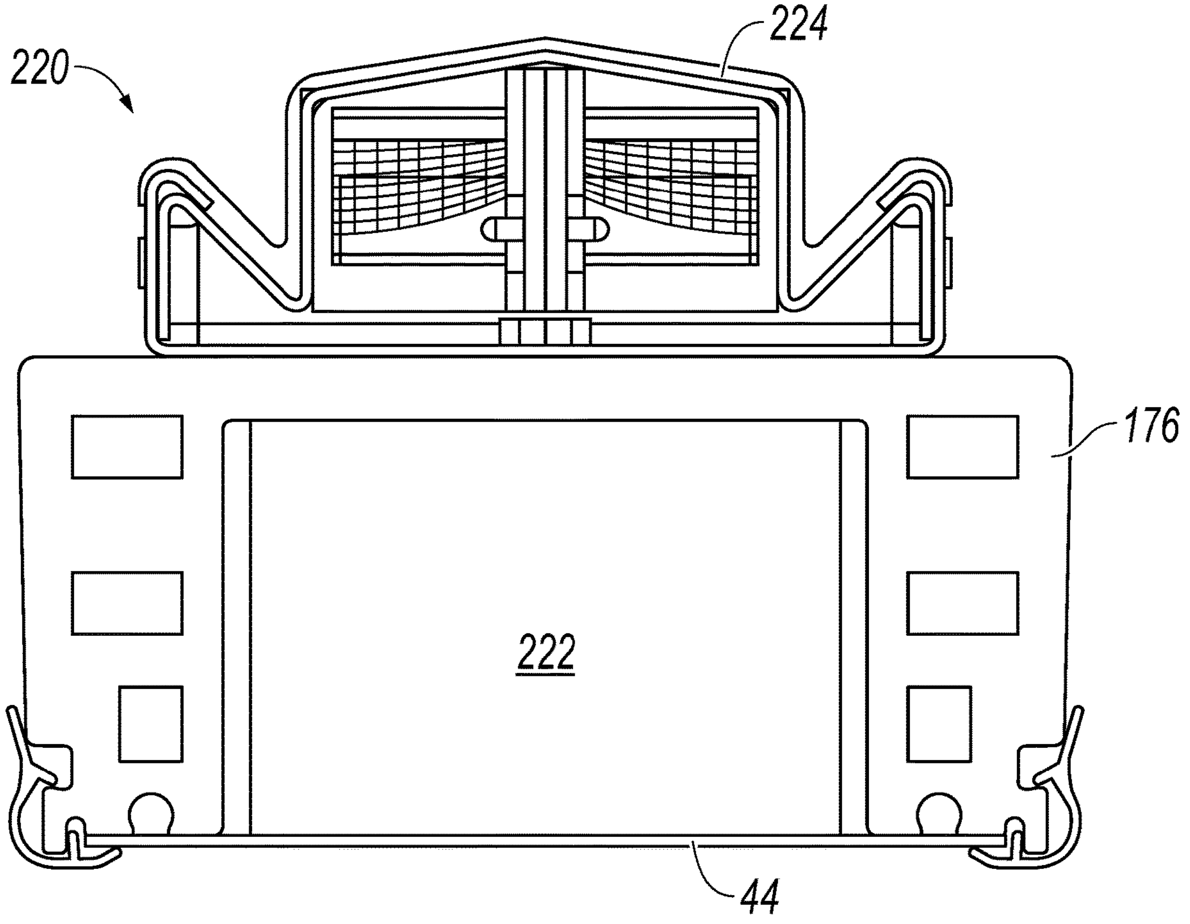
FIG. 19 depicts an alternate implementation of a mullion having lateral sections with spaced walls.

FIG. 19 depicts an alternate implementation of a mullion having lateral sections with spaced walls. In this example, the walls of lateral section 176 of mullion 220 define a series of pockets 100 from front to back of lateral section 176. Insulating member 222 is included between lateral sections 176. Insulating member 222 can be in contact the rear surface of contact plate and the front surface of rear section 176. Mullion 220 also includes light 224.

Figure 20:
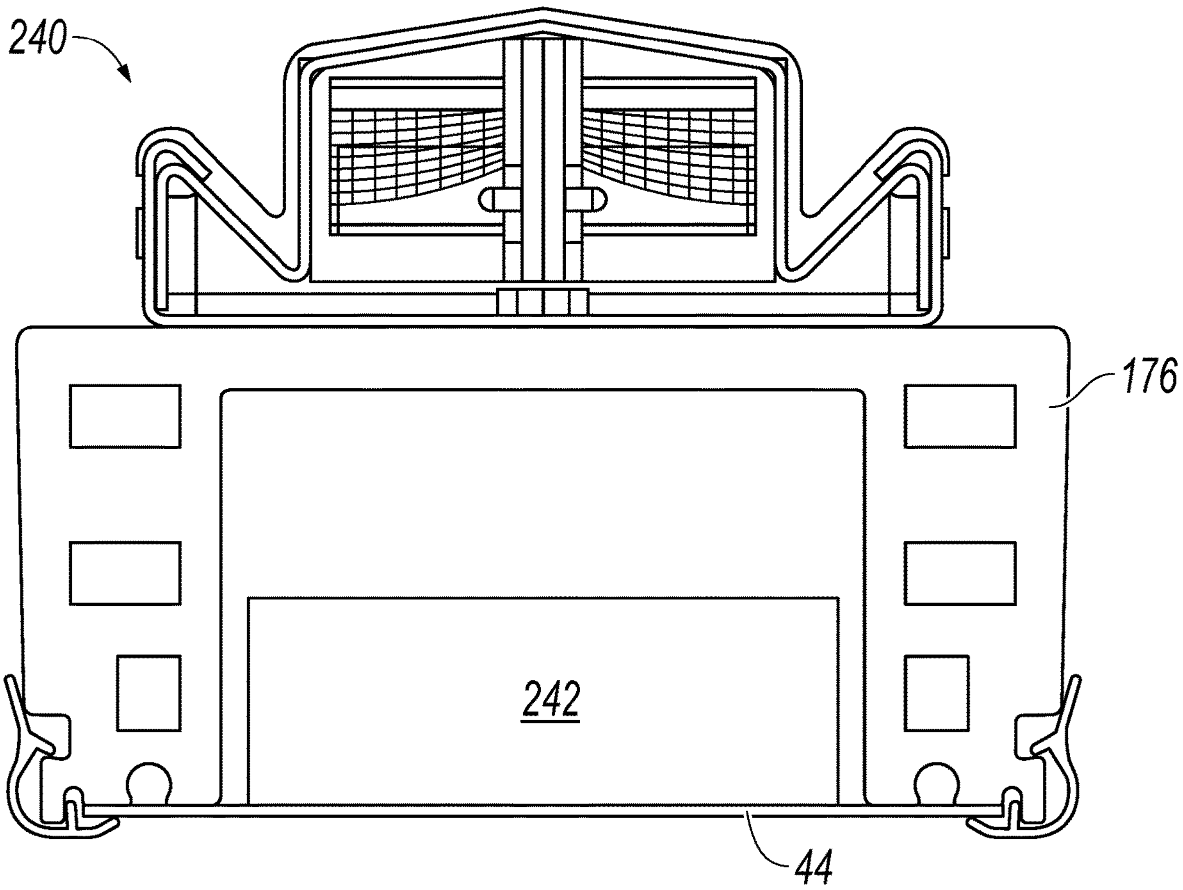
FIG. 20 depicts another alternate implementation of a mullion having lateral sections with spaced walls.

FIG. 20 depicts another alternate implementation of a mullion having lateral sections with spaced walls. In this example, insulating member 242 of mullion 240 contacts the rear surface of contact plate 44. However, insulating member 242 only partially fills the interior space of mullion 240. Thus, the interior space of mullion can accommodate other components, such as electrical wiring.

In each of the implementations shown in FIGS. 19 and 20, an external finish can be included of the body of the mullion. The external finish may decrease air infiltration and form a thermal barrier.

Figure 21:
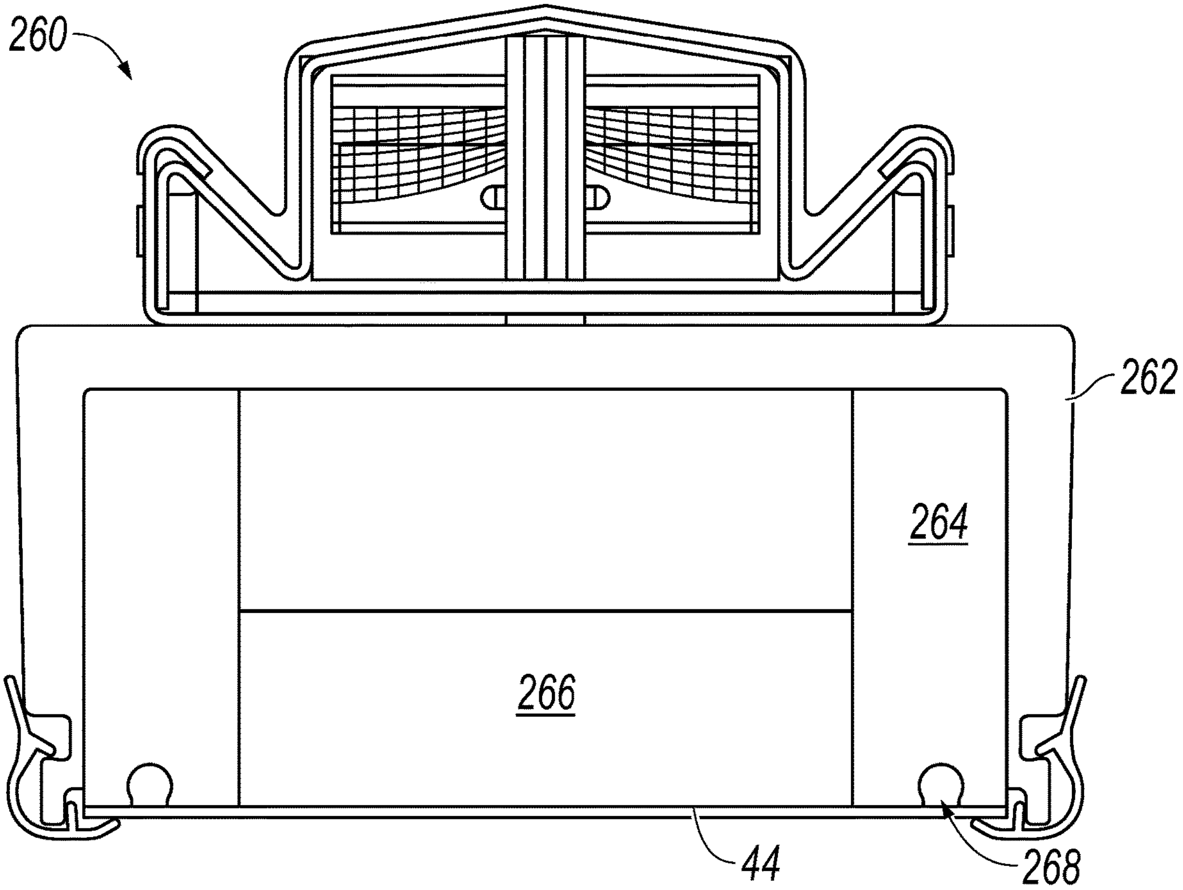
FIG. 21 depicts a mullion including lateral insulating members according to an illustrative implementation.

In some implementations, insulating members are placed on one or more interior surfaces of a mullion body. FIG. 21 depicts a mullion including lateral insulating members according to an illustrative implementation. Mullion 260 includes body 262, lateral insulating members 264, and contact plate insulating member 266. Contact plate insulating member 266 can span the distance between lateral insulating members 264. Each of lateral insulating members 264 includes a channel 268 for a heater wire.

Figure 22:
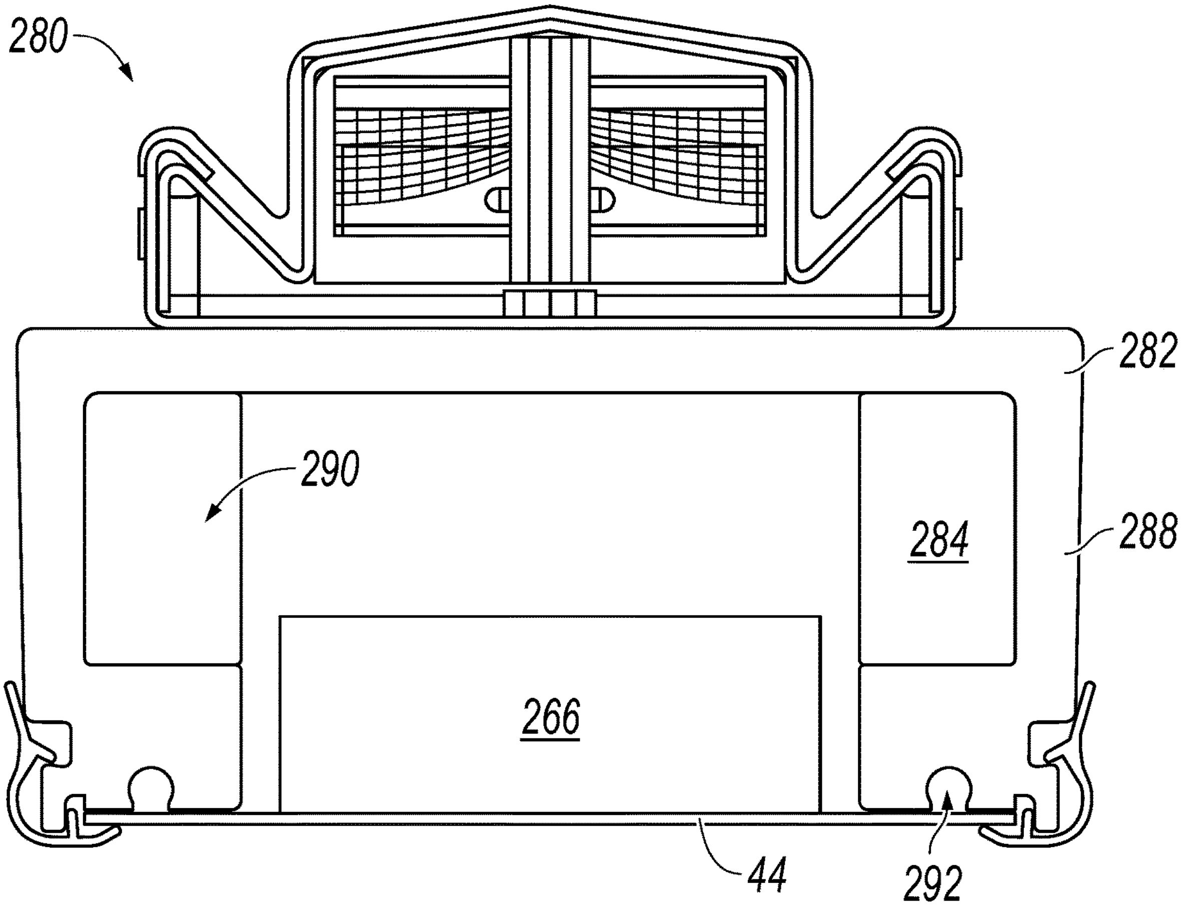
FIG. 22 depicts a mullion including lateral insulating members according to an illustrative implementation.

FIG. 22 depicts a mullion including lateral insulating members according to an illustrative implementation. Mullion 280 includes body 282, lateral insulating members 284, and contact plate insulating member 286. Body 282 includes lateral sections 288. Lateral sections 288 includes interior channels 290 and heater wire channels 292. Lateral insulating members 284 are installed in interior channels 290.

Figure 23:
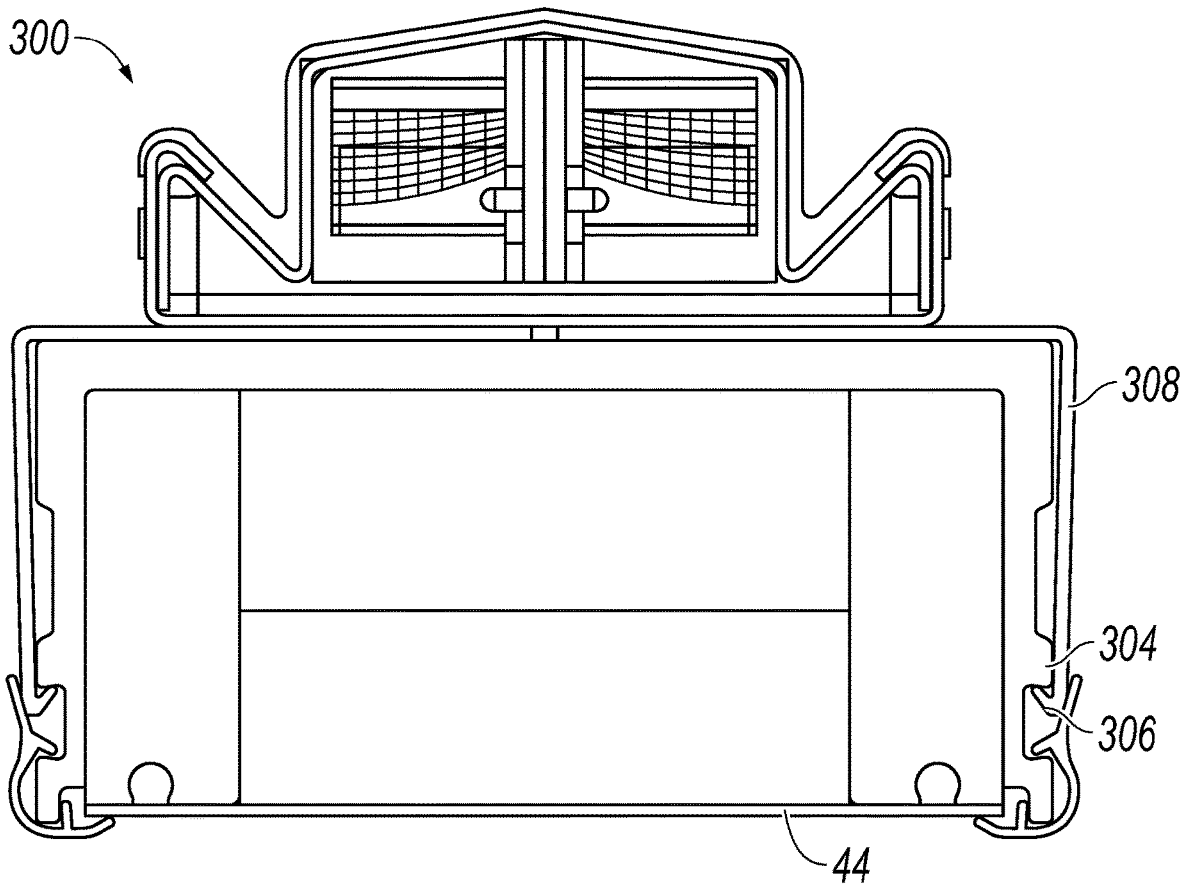
FIG. 23 depicts a mullion including lateral insulating members according to another illustrative implementation.

FIG. 23 depicts a mullion including lateral insulating members according to another illustrative implementation. Mullion 300 has a construction similar to that of the implementation described above with respect to FIG. 21. In this example, however, body 302 includes exterior ridges 304 that can engage with corresponding engaging portions 306 on a cover 308.

Figure 24:
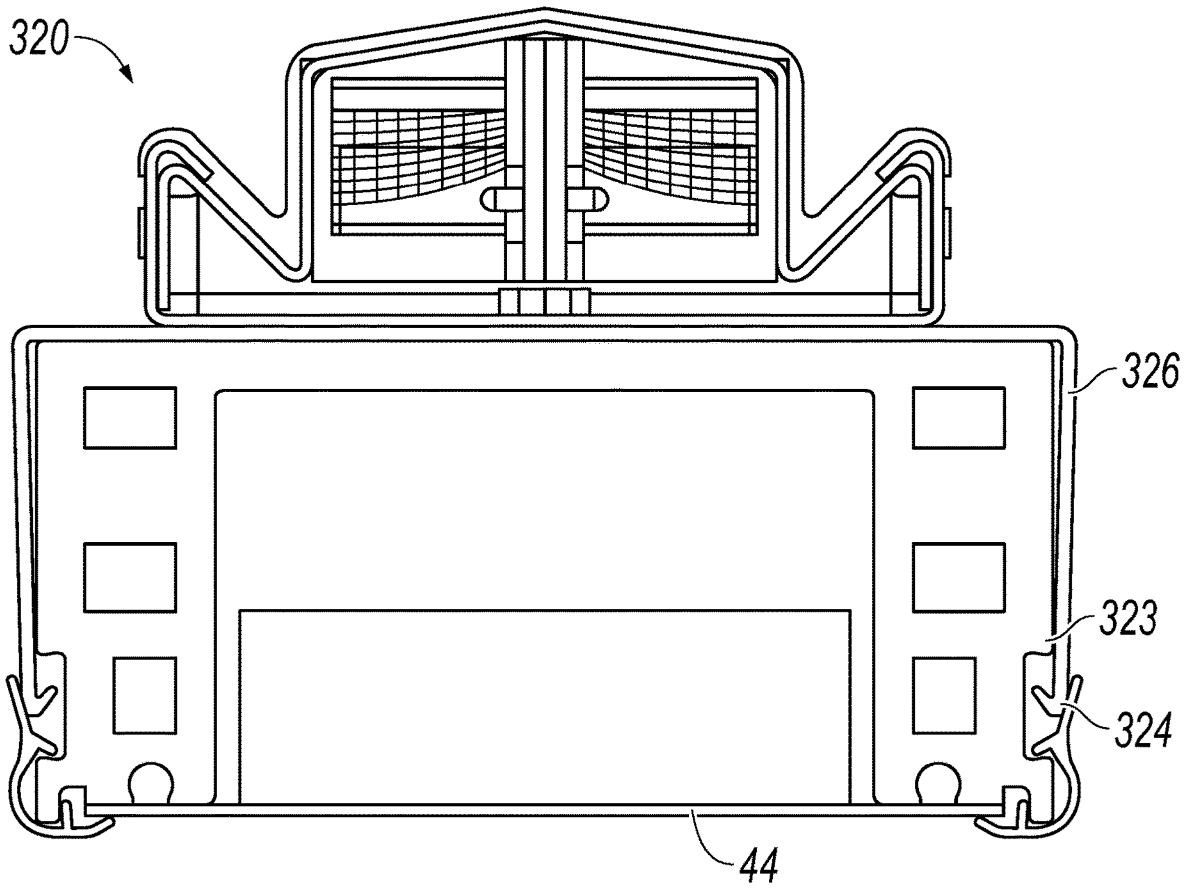
FIG. 24 depicts another mullion including a cover according to implementations of the present disclosure.

FIG. 24 depicts another mullion including a cover. Mullion 320 has a construction similar to that of the implementation described above with respect to FIG. 20. In this example, however, body 322 includes exterior notches 323 that can receive hooks 324 of cover 326.

Figure 25:
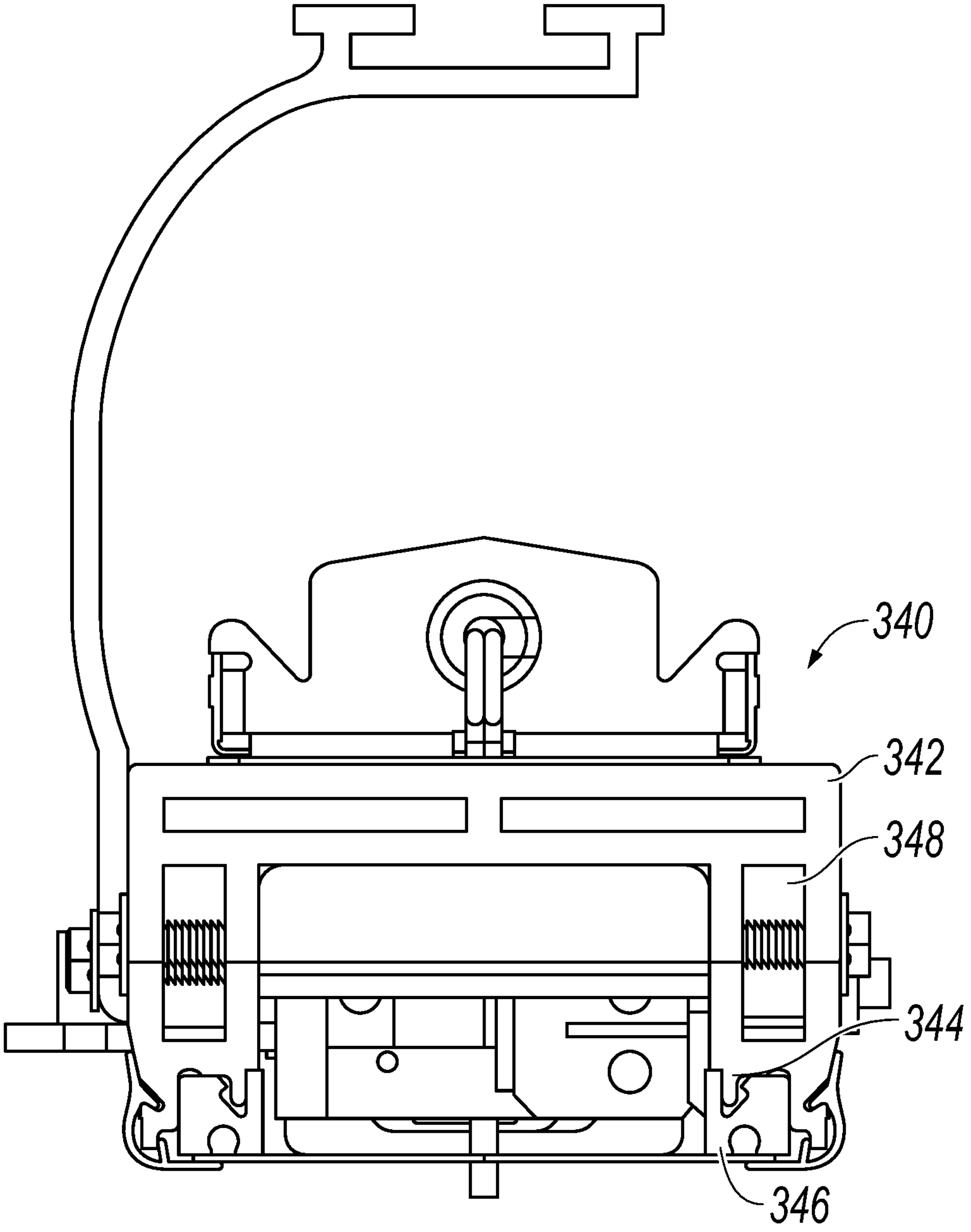
FIG. 25 illustrates depicts an example of a mullion having separate heater wire retainers according to implementations of the present disclosure.

Although various implementations described above include heater wire channels that are integral to a mullion body, in other implementations a heater wire can be held in a separate retainer. FIG. 25 illustrates depicts an example of a mullion having separate heater wire retainers. Mullion body 340 of mullion 342 includes engaging portions 344. A heater wire retainer 346 can be installed on each of engaging portions 344. Mullion body 340 has dual-wall lateral sections and rear section with pockets 346 in each section.

Insulating members can be, in some implementations, made of an extruded polystyrene foam material such as Blue Board produced by Dow Chemical Company. Other thermally insulating materials, such as a cellular PVC foam material, Celuka, or ABS can be used in some implementations.

In some implementations, the frame assembly includes an L-shaped thermally insulating backing member that fits on the back and interior faces of the main frame member of a mounting frame for the door of a commercial refrigerated enclosure. The backing member includes insulation for reducing thermal transference between the frame and the interior space of the enclosure. The interior leg of the L-shaped backing member may run from the back of the frame to the trailing edge of the door gasket. The contact plate of the frame can extend an interior direction over the interior leg of the backing member. In some implementations, the frame assembly includes an L-shaped thermally insulating backing member that fits on the back and interior faces of the main frame member of a mounting frame for the door of a commercial refrigerated enclosure. The backing member includes insulation for reducing thermal transference between the frame and the interior space of the enclosure. The interior leg of the L-shaped backing member may run from the back of the frame to the trailing edge of the door gasket. The contact plate of the frame can extend an interior direction over the interior leg of the backing member.

In certain implementations, a frame includes an elongated edge on the front portion of the frame to increase heat absorption to keep temperature of the frame high enough to avoid condensation. In one implementation, the width of the forward flange of the main frame member is selected to increase heat absorption from the ambient warm air into the frame to inhibit condensation on the frame. An insulating strip may be included behind the forward flange (between the forward flange and the enclosure in which the frame is installed).

In certain implementations, frame members, mullion members, or both, of a refrigerated enclosure have heater wire grooves that position a heater wire in direct contact with contact plate of the frame.

As used herein, a “member” can be a unitary structure or a combination of two or more members or components.

As used herein, “coupled” includes directly or indirectly connected. Two elements are coupled if they contact one another (e.g., where faces of a backing member and a contact plate are in contact with one another), but may also be coupled where they do not contact one another.

As used herein, the terms “perpendicular,” “substantially perpendicular,” or “approximately perpendicular” refer to an orientation of two elements (e.g., lines, axes, planes, surfaces, walls, or components) with respect to one and other that forms a ninety degree (perpendicular) angle within acceptable engineering, machining, or measurement tolerances. For example, two surfaces can be considered orthogonal to each other if the angle between the surfaces is within an acceptable tolerance of ninety degrees (e.g., ±1-5 degrees).

In certain implementations, a frame includes an elongated edge on the front portion of the frame to increase heat absorption to keep temperature of the frame high enough to avoid condensation. In one implementation, the width of the forward flange of the main frame member is selected to increase heat absorption from the ambient warm air into the frame to inhibit condensation on the frame. An insulating strip may be included behind the forward flange (between the forward flange and the enclosure in which the frame is installed).

In certain implementations, frame members, mullion members, or both, of a refrigerated enclosure have heater wire grooves that position a heater wire in direct contact with contact plate of the frame.

As used herein, a “flange” includes any projecting portion from another portion of a component or assembly. Examples of a flange include a rim, a rib, a ridge, a collar, or a tab. In some cases, a flange goes all the way around the perimeter or circumference of the body of the component. In other cases, a flange only extends locally (such as a tab) or on one side of the body of the component. A flange can be flat or can be other shapes (curved, corrugated, irregular). As used herein, a flange may or may not provide structural reinforcement (though in many implementations a flange will provide such structural reinforcement) A flange may or may not be used for attachment of other components and may or may not be load-bearing.

As used herein in the context of a mullion, “interior” space refers to space that is at least partially enclosed within the mullion. For example, a central interior space can be formed between opposing lateral walls of a segment of the mullion. In some cases, a mullion can be open on one or more sides (for example, open on the front, open on the back, open on front a back). In some cases, an interior space can be formed in one or more pockets or channels in or between the walls of the mullion. “Interior” does not imply that the space is bounded on all sides.

As used herein, a “member” can be a unitary structure or a combination of two or more members or components.

As used herein, “coupled” includes directly or indirectly connected. Two elements are coupled if they contact one another (e.g., where faces of a backing member and a contact plate are in contact with one another), but may also be coupled where they do not contact one another.

As used herein, “engaging” refers to physical engagement, coupling, or connection of two components with one another. Engaging can be accomplished with or without additional components, such as screws, bolts, nuts, rivets, clips, or adhesives.

As used herein, the terms “perpendicular,” “substantially perpendicular,” or “approximately perpendicular” refer to an orientation of two elements (e.g., lines, axes, planes, surfaces, walls, or components) with respect to one and other that forms a ninety degree (perpendicular) angle within acceptable engineering, machining, or measurement tolerances. For example, two surfaces can be considered orthogonal to each other if the angle between the surfaces is within an acceptable tolerance of ninety degrees (e.g., ±1-5 degrees).

It should be noted that the orientation of various elements may differ according to other exemplary embodiments, and that such variations are intended to be encompassed by the present disclosure.

While a number of examples have been described for illustration purposes, the foregoing description is not intended to limit the scope of the invention, which is defined by the scope of the appended claims. There are and will be other examples and modifications within the scope of the following claims. For example, the construction and arrangement of the refrigerated case with thermal door frame as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the description and advantages of the subject matter disclosed herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. Other substitutions, modifications, changes and omissions may be made in the design, operating conditions and arrangement of the various exemplary embodiments without departing from the scope of the present inventions.

What is claimed is:

1. A mullion, comprising:
- a contact plate; and
- a body configured to vertically couple to top and bottom frame segments of a thermal frame and spaced apart from side frame segments of the thermal frame, the body comprising:
  - a first co-extruded portion; and
  - a second co-extruded portion adjacent to the first co-extruded portion, the second co-extruded portion comprising a mullion front pad segment configured to couple to the contact plate as a thermal break between the first co-extruded portion and the contact plate, wherein the second co-extruded portion has a lower density than the first co-extruded portion.

2. The mullion of claim 1, wherein the second co-extruded portion comprises a cellular material.

3. The mullion of claim 1, wherein the body comprises a rigid polymer with glass fiber.

4. The mullion of claim 1, wherein the mullion front pad segment comprises a pair of pads spaced from one another, wherein each of the pads comprises a front surface configured to couple with a portion of the contact plate.

5. The mullion of claim 1, wherein the second co-extruded portion comprises one or more channels configured to receive a heater wire for the mullion.

6. The mullion of claim 1, wherein the first co-extruded portion comprises one or more lateral sections of the mullion.

7. The mullion of claim 1, wherein the first co-extruded portion comprises one or more lateral sections of the mullion, wherein at least one of the lateral sections is at least about ⅜ inches thick.

8. The mullion of claim 1, wherein the second co-extruded portion comprises one or more zipper engaging portions, the mullion further comprising one or more zippers configured to couple with the second co-extruded portion and retain the contact plate on the mullion.

9. The mullion of claim 1, further comprising one or more zippers configured to couple with the second co-extruded portion and retain the contact plate on the mullion, wherein at least one of the zippers comprises a flat front surface.

10. The mullion of claim 1, further comprising an external finish over at least a portion of the body, wherein the external finish is configured to reduce heat transfer between the body and air surrounding the body.

11. The mullion of claim 1, wherein the first co-extruded portion comprises a rear section and a pair of opposing lateral sections adjoining either side of the rear section, wherein at least one of the lateral sections or the rear section comprises two or more walls spaced from one another such as to define one or more pockets in the body of the mullion.

12. A method of making a mullion, comprising:
- extruding a first portion of a segment of the mullion, the first portion comprising a mullion base segment; and
- co-extruding, along with the first portion, a second portion of the segment, the second portion comprising a mullion front pad segment configured to couple to a contact plate as a thermal break between the mullion base segment and the contact plate,
- wherein the second portion has a lower density than the first portion.

13. A mullion, comprising:
- a body configured to vertically couple to top and bottom frame segments of a thermal frame and spaced apart from side frame segments of the thermal frame, the body comprising:
  - a rear section; and
  - a pair of opposing lateral sections adjoining either side of the rear section, wherein at least one of the lateral sections comprises two or more walls spaced from one another in a lateral direction, wherein the lateral sections comprise a front surface; and
- pads coupled to the front surfaces of the two or more walls, the pads configured to couple to a contact plate as a thermal break between the pair of opposing lateral sections and the contact plate.

14. The mullion of claim 13, wherein at least one of the lateral sections comprises one or more pockets between at least two of the walls.

15. The mullion of claim 13, wherein at least one of the lateral sections is at least about ⅜ inches thick.

16. The mullion of claim 13, further comprising the contact plate is configured to couple with at least one of the rear section or the pair of opposing lateral sections of the body.

17. The mullion of claim 13, wherein the body comprises a zipper engaging portion, the mullion further comprises one or more zippers configured to couple with the body and retain the contact plate on the mullion.

18. The mullion of claim 13, further comprising an external finish over at least a portion of the body, wherein the external finish is configured to reduce heat transfer between the body and air surrounding the body.

19. The mullion of claim 13, wherein at least a portion of the body is co-extruded such that a front portion of the body has a lower density than a rear portion of the body.

20. A mullion, comprising:

a body configured to vertically couple to top and bottom frame segments of a thermal frame and spaced apart from side frame segments of the thermal frame, the body comprising:

a rear section; and a pair of opposing lateral sections adjoining either side of the rear section; and one or more insulating members interior to the body, wherein at least one of the insulating members is on an interior surface one of the lateral sections; and a front pad segment coupled to the pair of opposing lateral sections, the front pad segment configured to couple to a contact plate as a thermal break between the body and the contact plate.

21. The mullion of claim 20, wherein at least one of the insulating members comprises a foam material.

22. The mullion of claim 20, wherein the one or more insulating members comprises a first insulating member on the interior surface of one of the lateral sections and a second insulating member on the interior surface of the other one of the lateral sections.

23. The mullion of claim 22, wherein the one or more insulating members further comprise a third insulating member between the first insulating member and the second insulating member.

24. The mullion of claim 20, wherein at least one of the insulating members comprises a channel for a heater wire.

25. The mullion of claim 20, wherein at least one of lateral sections comprises an interior channel, wherein at least one of the insulating members is at least partially in the interior channel.

26. The mullion of claim 25, wherein at least one of the lateral sections comprises a channel for a heater wire in front of the interior channel.

27. The mullion of claim 20, further comprising a mullion cover configured to couple to the body.

* * * * *